(12) United States Patent
Gasparini et al.

(10) Patent No.: US 9,450,489 B2
(45) Date of Patent: Sep. 20, 2016

(54) ENHANCED DC-DC CONVERTER, METHOD FOR OPERATING THE DC-DC CONVERTER, ENVIRONMENTAL ENERGY-HARVESTING SYSTEM COMPRISING THE DC-DC CONVERTER, AND APPARATUS COMPRISING THE ENERGY-HARVESTING SYSTEM

(71) Applicant: STMicroelectronics S.r.l., Agrate Brianza (IT)

(72) Inventors: Alessandro Gasparini, Cusano Milanino (IT); Eugenio Miluzzi, Milan (IT); Alberto Cattani, Cislago (IT); Stefano Ramorini, Arluno (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 373 days.

(21) Appl. No.: 14/181,063

(22) Filed: Feb. 14, 2014

(65) Prior Publication Data
US 2014/0232189 A1   Aug. 21, 2014

(30) Foreign Application Priority Data
Feb. 21, 2013   (IT) .................... TO2013A0144

(51) Int. Cl.
| | |
|---|---|
| H02M 3/158 | (2006.01) |
| H02M 3/335 | (2006.01) |
| H02J 1/00 | (2006.01) |
| H02M 1/00 | (2006.01) |

(52) U.S. Cl.
CPC ........... *H02M 3/158* (2013.01); *H02M 3/1584* (2013.01); *H02M 3/33561* (2013.01); *H02M 2001/009* (2013.01); *H02M 2001/0087* (2013.01); *Y10T 307/406* (2015.04)

(58) Field of Classification Search
CPC ....................................................... H02J 1/00
USPC ............................................................ 307/82
See application file for complete search history.

(56) References Cited

U.S. PATENT DOCUMENTS

| | | | |
|---|---|---|---|
| 2008/0231115 A1* | 9/2008 | Cho ............... | H02J 1/08 307/41 |
| 2013/0234513 A1* | 9/2013 | Bayer ............ | G05F 1/577 307/31 |

FOREIGN PATENT DOCUMENTS

| | | | |
|---|---|---|---|
| EP | 2518878 A1 | 10/2012 | |
| GB | 2460072 A | * 11/2009 | .......... H02M 3/1582 |

OTHER PUBLICATIONS

Italian Search Report and Written Opinion for IT TO2013A000144 mailed Oct. 30, 2013 (8 pages).

(Continued)

*Primary Examiner* — Robert Deberadinis
(74) *Attorney, Agent, or Firm* — Gardere Wynne Sewell LLP

(57) ABSTRACT

A DC-DC converter independently supplies electrical loads. For each load, an output load signal is compared to a reference to generate a result indicating a need to supply the respective electrical load. A first detection is made as to whether a first electrical load needs to be supplied and a second detection is made as to whether any remaining electrical loads need to be supplied. The first electrical load is supplied if the first detection is positive and the second detection is negative.

23 Claims, 18 Drawing Sheets

(56) References Cited

OTHER PUBLICATIONS

Dongwon Kwon et al: "Single-Inductor Multiple-Output Switching DC-DC Converters," IEEE Transacton on Circuits and System II: Express Briefs, IEEE< US, vol. 56, No. 8, Aug. 1, 2009, pp. 614-618.

Chi-Ying Tsui et al: "A Pseudo-CCM/DCM SIMO Switching Converter with Freewheel Switching," IEEE Journal of Solid-State Circuits, IEEE Service Center, Piscataway, NJ, USA, vol. 38, No. 6, Jun. 1, 2003, pp. 1007-1014.

Belloni M et al: "On the Design of Single-Inductor Multiple-Output DC-DC Buck Converters," Circuits and System,s 2008, ISCAS 2008, IEEE International Symposium on, IEEE, Piscataway, NJ, USA, May 18, 2008, pp. 3049-3052.

* cited by examiner

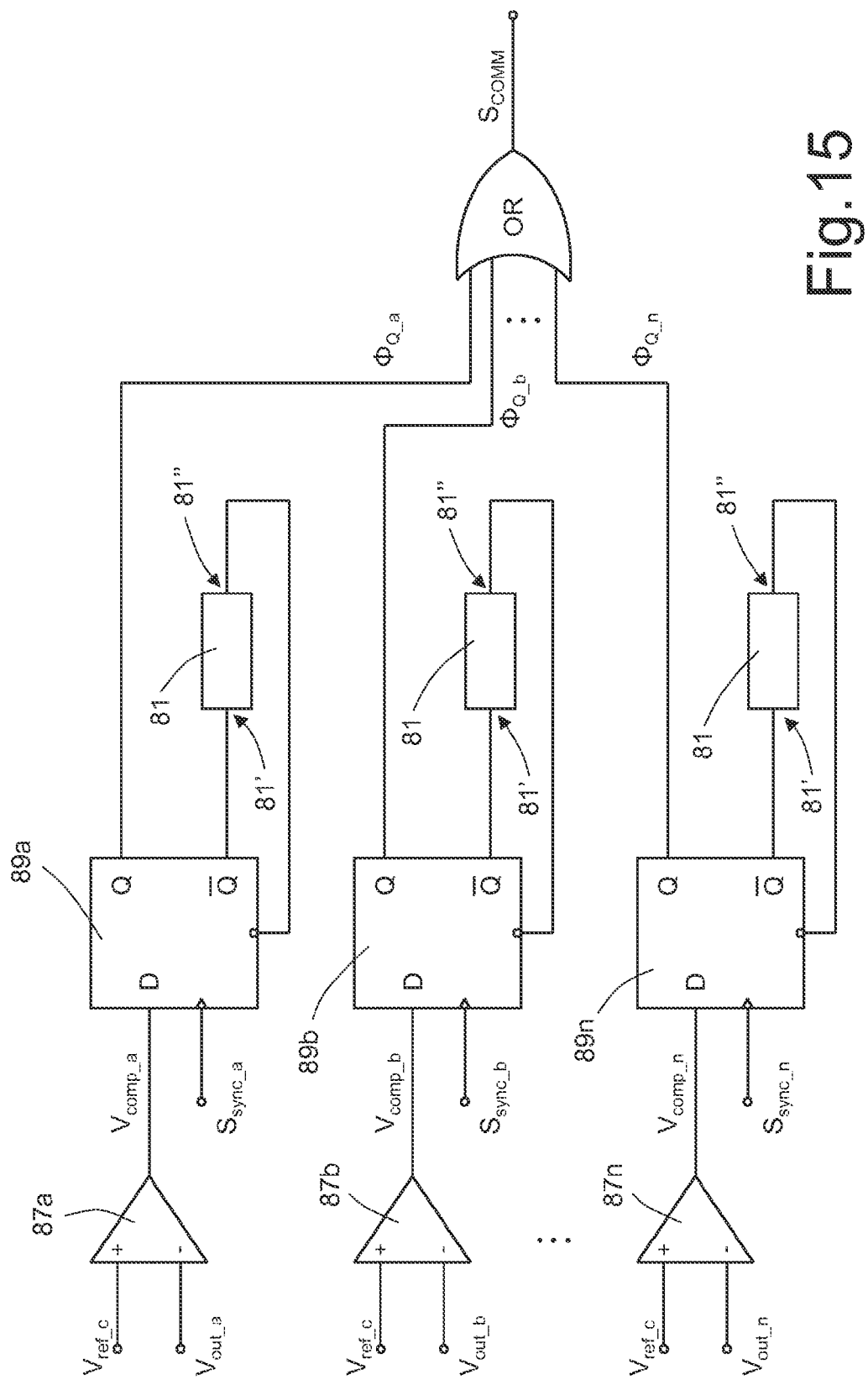

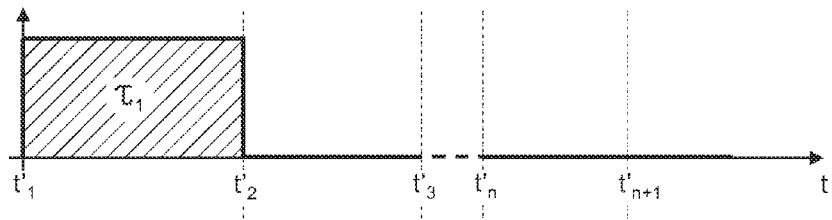
Fig.21A
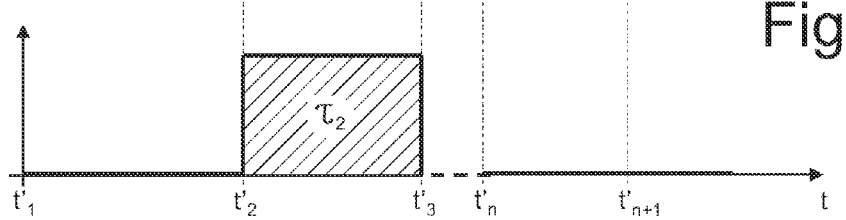
Fig.21B
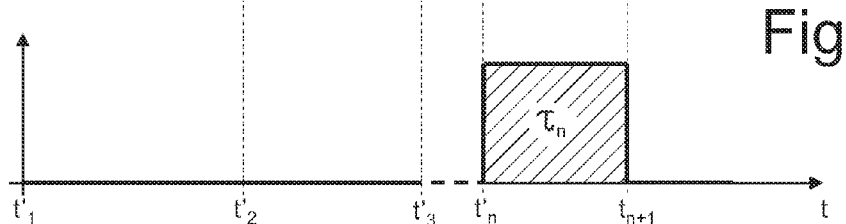
Fig.21C
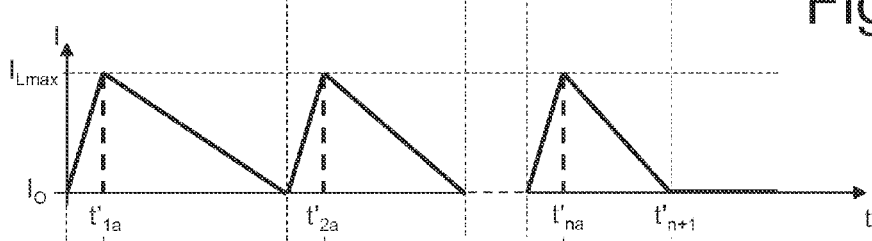
Fig.21D
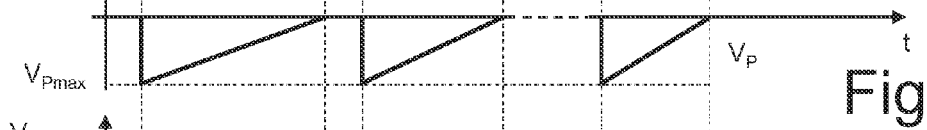
Fig.21E
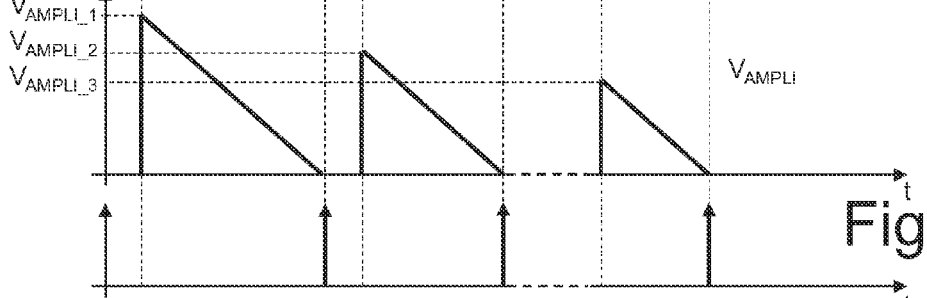
Fig.21F
Fig.21G

ENHANCED DC-DC CONVERTER, METHOD FOR OPERATING THE DC-DC CONVERTER, ENVIRONMENTAL ENERGY-HARVESTING SYSTEM COMPRISING THE DC-DC CONVERTER, AND APPARATUS COMPRISING THE ENERGY-HARVESTING SYSTEM

PRIORITY CLAIM

This application claims priority from Italian Application for Patent No. TO2013A000144 filed Feb. 21, 2013, the disclosure of which is incorporated by reference.

TECHNICAL FIELD

The present invention relates to a DC-DC converter, in particular of a single-inductor multiple-output (SIMO) type. The present invention moreover relates to an environmental energy-harvesting system comprising the DC-DC converter, and to an apparatus comprising the environmental energy-harvesting system.

BACKGROUND

As is known, systems for harvesting energy (also known as "energy-harvesting systems" or "energy-scavenging systems") from intermittent environmental energy sources (i.e., sources that supply energy in an irregular way) have aroused and continue to arouse considerable interest in a wide range of technological fields. Typically, energy-harvesting systems are configured to harvest, store, and transfer energy generated by mechanical sources to a generic load of an electrical type.

Low-frequency vibrations, such as, for example, mechanical vibrations of disturbance in systems with moving parts, can be a valid source of energy. The mechanical energy is converted by one or more appropriate transducers (for example, piezoelectric or electromagnetic devices) into electrical energy, which can be used for supplying an electrical load. In this way, the electrical load does not require batteries or other supply systems that are cumbersome and poorly resistant to mechanical stresses.

FIG. 1 is a schematic illustration, by means of functional blocks, of an energy-harvesting system of a known type.

The energy-harvesting system 1 of FIG. 1 comprises: a transducer 2, for example of an electromagnetic or piezoelectric type, subject during use to environmental mechanical vibrations and configured for converting mechanical energy into electrical energy, typically into AC (alternating current) voltages; a scavenging interface 4, for example comprising a diode-bridge rectifier circuit (also known as Graetz bridge), configured for receiving at input the AC signal generated by the transducer 2 and supplying at output a DC (direct current) signal for charging a capacitor 5 connected to the output of the rectifier circuit 4; and a DC-DC converter 6, connected to the capacitor 5 for receiving at input the electrical energy stored by the capacitor 5 and supplying it to an electrical load 8. The capacitor 5 hence has the function of energy-storage element, energy which is made available, when required, to the electrical load 8 for operation of the latter.

The transducer 2 is, for example, an electrochemical transducer, or an electromechanical transducer, or an electroacoustic transducer, or an electromagnetic transducer, or a photoelectric transducer, or an electrostatic transducer, or a thermoelectric transducer.

The global efficiency $\eta_{TOT}$ of the energy-harvesting system 1 is given by Eq. (1) below $$\eta_{TOT} = \eta_{TRANSD} \cdot \eta_{SCAV} \cdot \eta_{DCDC} \tag{1}$$

where: $\eta_{TRANSD}$ is the efficiency of the transducer 2, indicating the amount of energy available in the environment that has been effectively converted by the transducer 2 into electrical energy; $\eta_{SCAV}$ is the efficiency of the scavenging interface 4, indicating the energy consumed by the scavenging interface 4 and the factor of impedance decoupling between the transducer and the interface; and $\eta_{DCDC}$ is the efficiency of the DC-DC converter 6.

As is known, in order to supply to the load the maximum power available, the impedance of the load should be equal to that of the source. The transducer 2 can be represented schematically, in this context, as a voltage generator 3 provided with an internal resistance $R_S$ of its own. The maximum power $P_{TRANSD}^{MAX}$ that the transducer 2 can supply at output may be defined as:

$$P_{TRANSD}^{MAX} = V_{TRANSD\_EQ}^2 / 4R_S \text{ if } R_{LOAD} = R_S \tag{2}$$

where: $V_{TRANSD\_EQ}$ is the voltage produced by the equivalent voltage generator; and $R_{LOAD}$ is the equivalent electrical resistance at the output of the transducer 2 (or, likewise, seen at input to the scavenging interface 4), which takes into due consideration the equivalent resistance of the scavenging interface 4, of the DC-DC converter 6, and of the load 8.

On account of the impedance decoupling ($R_{LOAD} \neq R_S$), the power at input to the scavenging interface 4 is lower than the maximum power available $P_{TRANSD}^{MAX}$.

The power $P_{SCAV}$ stored by the capacitor 5 is a fraction of the power recovered by the interface, and is given by Eq. (3) below $$P_{SCAV} = \eta_{TRANSD} \cdot \eta_{SCAV} \cdot P_{TRANSD}^{MAX} \tag{3}$$

while the power $P_{EL\_LOAD}$ supplied at output by the DC-DC converter to the electrical load 8 is given by the following Eq. (4)

$$P_{EL\_LOAD} = P_{DCDC} \cdot \eta_{DCDC} \tag{4}$$

where $P_{DCDC}$ is the power received at input by the DC-DC converter 8, in this case coinciding with $P_{SCAV}$.

The main disadvantage of the configuration according to FIG. 1 regards the fact that the maximum voltage supplied at output from the scavenging interface 4 is limited by the input dynamics of the DC-DC converter 8.

The voltage $V_{OUT}$ across the capacitor 5 (supplied at output from the scavenging interface 4 and at input to the DC-DC converter 8) is in fact determined on the basis of the balancing of power according to the following Eq. (5)

$$P_{STORE} = P_{SCAV} - P_{DCDC} \tag{5}$$

where $P_{STORE}$ is the excess power with respect to what is required by the load, recovered by the harvesting interface 4 and stored in the capacitor 5.

In applications where the transducer 2 converts mechanical energy into electrical energy in a discontinuous way (i.e., the power $P_{TRANSD}^{MAX}$ varies significantly in time) and/or the power $P_{EL\_LOAD}$ required by the electrical load 8 varies significantly in time, also the voltage $V_{OUT}$ consequently presents a plot that is variable in time.

This causes, for example, a variation of the efficiency factor $\eta_{DCDC}$ which assumes low values at high values of $V_{OUT}$. The maximum value of $V_{OUT}$ is moreover limited by the range of input voltages allowed by the DC-DC converter.

European Patent Application No. EP 2518878, incorporated herein by reference, describes a DC-DC converter that makes it possible to maintain an efficiency factor $\eta_{DCDC}$ high even in a condition of light load and to obtain a high dynamic of input voltages. The DC-DC converter according to the document EP 2518878 is of the SIMO (single-inductor multiple-output) type, and is configured to supply a plurality of electrical loads. However, such a DC-DC converter presents some limitations. For example, the supply of the electrical loads follows a fixed-time multiplexing procedure, which envisages a pre-set sequence of supply of the electrical loads. Moreover, each load is supplied during a respective time slot, the duration of which is defined by a pre-set clock signal independent of the load that is being supplied.

SUMMARY

Embodiments provide a DC-DC converter, a method for operating the DC-DC converter, an energy-harvesting system comprising the DC-DC converter, and an apparatus comprising the energy-harvesting system that will enable the aforesaid problems and disadvantages to be overcome. In particular, the DC-DC converter enables an efficiency factor $\eta_{DCDC}$ to be kept high even in conditions of light load, for example of the order of some hundreds of microwatts. Moreover, according to one aspect the levels of energy consumption are minimized. According to a further aspect the sequence and the duration of the time slots are optimized on the basis of the electrical loads applied to the DC-DC converter.

BRIEF DESCRIPTION OF THE DRAWINGS

For a better understanding of the present invention, preferred embodiments thereof are now described, purely by way of non-limiting example and with reference to the attached plates of drawings, wherein:

FIG. 15 shows a circuit including the circuit of FIG. 14 and configured to generate a clock signal;

FIGS. 21A-21G show schematically a time division of supply of electrical loads (FIGS. 21A-21C), steps of charging and complete discharging of the inductor 18 of the DC-DC converter of FIG. 2, or FIG. 3, or FIG. 13 (FIG. 21D), and operating signals associated to the current-sensing circuit of FIG. 20 (FIGS. 21E-21G), according to a further embodiment;

DETAILED DESCRIPTION OF THE DRAWINGS

Figure 2:
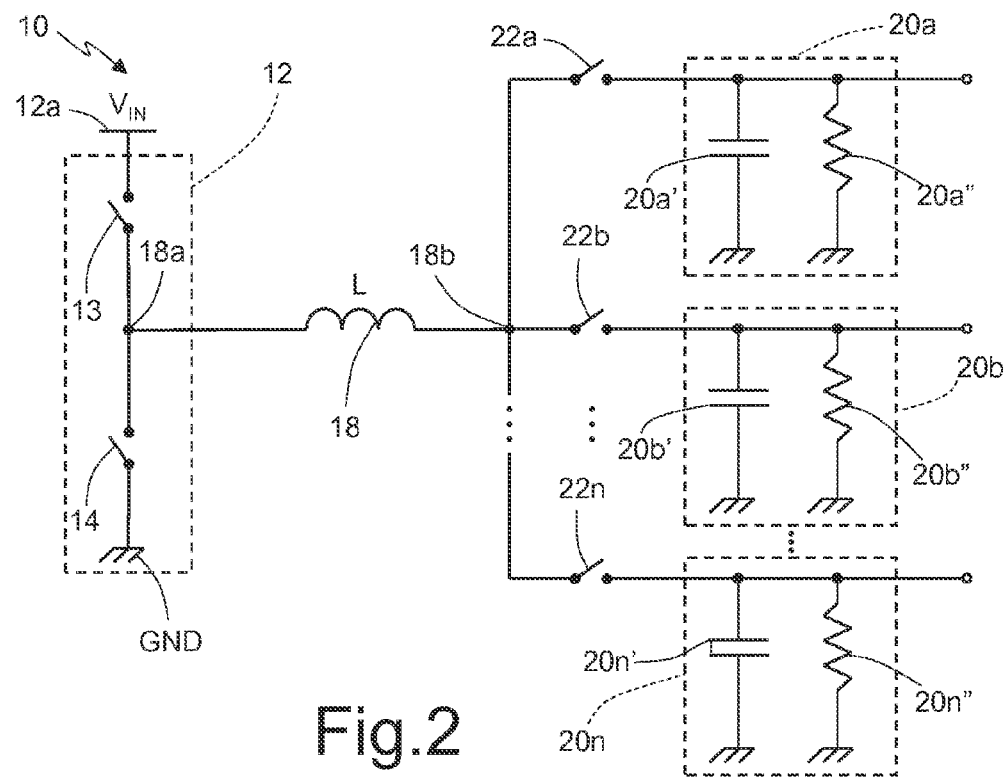
FIG. 2 is a schematic illustration of a DC-DC converter of a single-inductor multiple-output (SIMO) type.

FIG. 2 is a schematic illustration of a DC-DC converter 10, in particular of a "buck" type, comprising a single inductor coupled to the input of the DC-DC converter 10, and a plurality of outputs for supplying a respective plurality of loads 20a-20n, also known as SIMO (single-inductor multiple-output) converter.

In greater detail, the converter 10 comprises a main bridge 12, including a supply terminal 12a at voltage $V_{IN}$ (with $V_{IN}$ ranging, for example, between 1 V and 40 V) and a reference terminal at ground voltage GND (for example, at approximately 0 V, even though other reference voltages can be used, for example $-V_{IN}$). The main bridge 12 moreover includes a high-side switch 13 and a low-side switch 14, connected in series to one another between the supply terminal 12a and the reference terminal GND. In particular, the high-side switch 13 is connected directly to the supply terminal 12a for receiving the signal $V_{IN}$, and the low-side switch 14 is connected directly to the reference terminal GND.

According to one embodiment (see FIG. 3), the high-side switch 13 is a MOSFET, in particular an n-channel double-diffusion MOS (DMOS) transistor with resistance in an ON state ($R_{ON}$) of approximately 1Ω at 100 mA. The low-side switch 14 is of the same type as the transistor 13. Alternatively, the high-side switch 13 and the low-side switch 14 can be obtained with a different technology; for example, they may be p-channel MOSFETs, or NPN or PNP bipolar transistors, IGBTs, or simply diodes.

Figure 3:
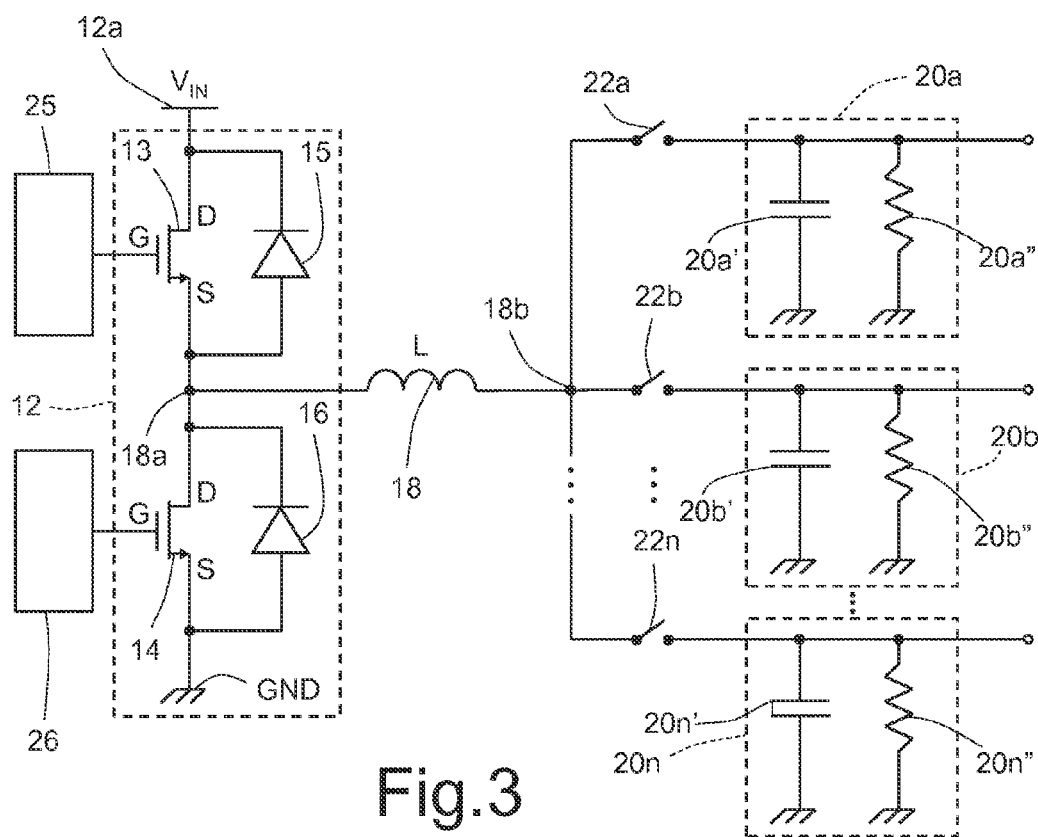
FIG. 3 shows in greater detail the DC-DC converter of FIG. 2.

With reference to FIG. 3, a diode 15 and a diode 16 are connected between a respective source terminal S and a respective drain terminal D of the high-side switch 13 and of the low-side switch 14. The diodes 15 and 16 are connected in antiparallel configuration (with respect to the normal direction of flow of the current through the high-side switch 13 and the low-side switch 14). As is known, a characteristic of a MOSFET is that of displaying, under certain operating conditions, the electrical properties of a diode (parasitic diode). Said diode is electrically set (integrated) between the source and drain terminals of the MOSFET. In other words, the high-side switch 13 and the low-side switch 14 can present the electrical behavior of a diode, where the cathode of the diode corresponds to the drain terminal and the anode to the source terminal of the respective high-side switch 13 and low-side switch 14 (vice versa, in the case of p-type MOSFETs). In greater detail, the drain terminal D of the high-side switch 13 is connected to the supply terminal 12a, the source terminal S of the high-side switch 13 is connected to the drain terminal of the low-side switch 14, and the source terminal S of the low-side switch 14 is connected to the reference terminal GND. The high-side switch 13 and low-side switch 14 are driven in conduction by means of a respective first driving circuit 25 and second driving circuit 26, which are described more fully hereinafter. The driving circuits 25, 26 are connected to the control terminal or gate terminal G of the transistors that form the high-side switch 13 and low-side switch 14.

With joint reference to FIGS. 2 and 3, the DC-DC converter 10 further comprises an inductor 18, having an inductance L of between approximately 1 μH and approximately 20 μH.

The inductor 18 includes a first conduction terminal 18a connected between the high-side switch 13 and the low-side switch 14 (in particular, connected to the source terminal S and drain terminal D of the high-side switch 13 and of the low-side switch 14, respectively), and a second terminal 18b, connected to a plurality of electrical loads 20a, 20b, . . . , 20n by means of a plurality of respective coupling switches 22a, 22b, . . . , 22n. Each coupling switch 22a-22n is hence connected in series to the inductor 18.

Each electrical load 20a-20n includes, by way of example, a capacitor 20a'-20n' and a resistor 20a"-20b" connected between the second terminal 18b of the inductor 18 and the reference terminal GND.

The coupling switches 22a-22n, as shown in FIGS. 2 and 3, have the function of enabling a plurality of mutually independent outputs (the plurality of "n" electrical loads 20a-20n) to share the single inductor 18. To guarantee absence of cross conduction between the electrical loads 20a-20n, the coupling switches 22a-22n are controlled (opened/closed), according to one embodiment, using a time-multiplexing technique.

Each electrical load 20a-20n can require a supply voltage value $V_{out\_a}$, $V_{out\_b}$, . . . , $V_{out\_n}$, different from what is required by the other electrical loads 20a-20n. For example, each electrical load 20a-20n can require a supply voltage value $V_{out\_a}$-$V_{out\_n}$ comprised between 0.8 V and 3 V, or other values still according to the application.

In use, the energy required by the electrical loads 20a-20n for their operation is supplied by the inductor 18, which, in turn, is charged and discharged by controlling appropriately the high-side switch 13 and low-side switch 14 of the main bridge 12. The high-side switch 13 and low-side switch 14 are controlled (opened/closed) in such a way as to prevent a direct connection between the terminal 12a at supply voltage $V_{IN}$ and the ground reference terminal GND. In greater detail, the high-side switch 13 and low-side switch 14 are controlled using a hysteretic voltage control loop, illustrated in FIG. 8.

Figure 4A:
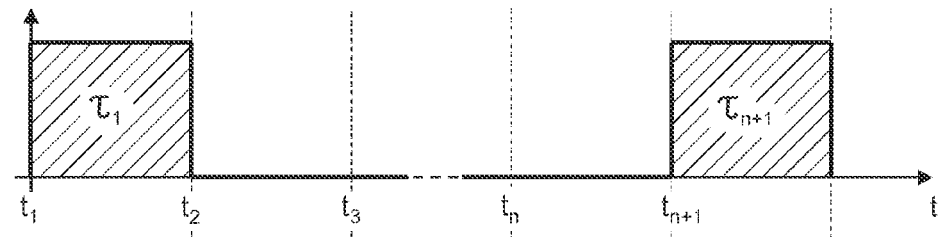
FIGS. 4A-4C show in schematic form a temporal division for supply of electrical loads by means of the DC-DC converter of FIG. 2 or FIG. 3 according to a time-multiplexing technique.
Figure 4B:
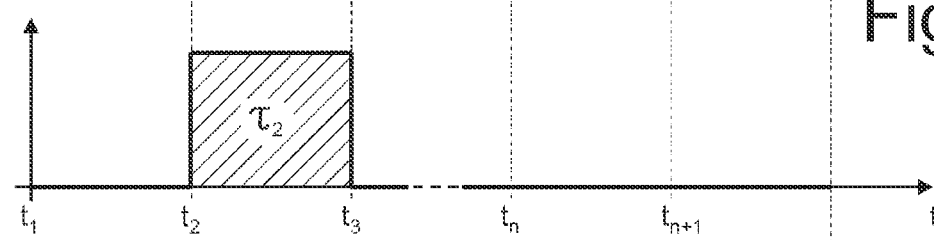
Figure 4C:
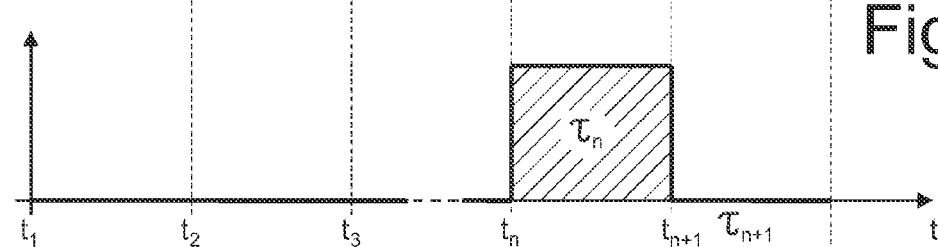

FIGS. 4A-4C show, using one and the same time scale (axis of the abscissae), a plurality of "n" time intervals $\tau_1$-$\tau_n$ during which the coupling switches 22a-22n are open or closed so as to implement the time-multiplexing control technique, according to one aspect.

Figure 5A:
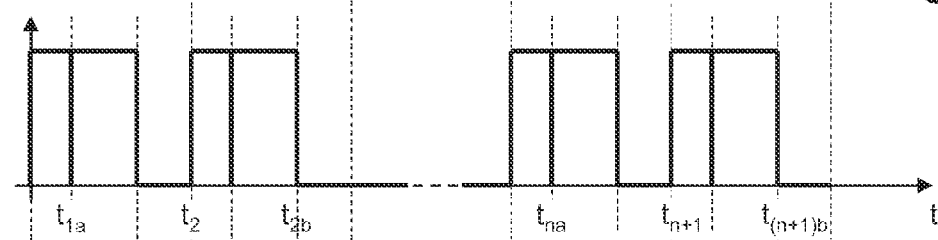
FIGS. 5A and 5B show by way of example steps of charging and complete discharging of the inductor 18 of the DC-DC converter of FIG. 2 or FIG. 3, according to a discontinuous-conduction mode (DCM)
Figure 5B:
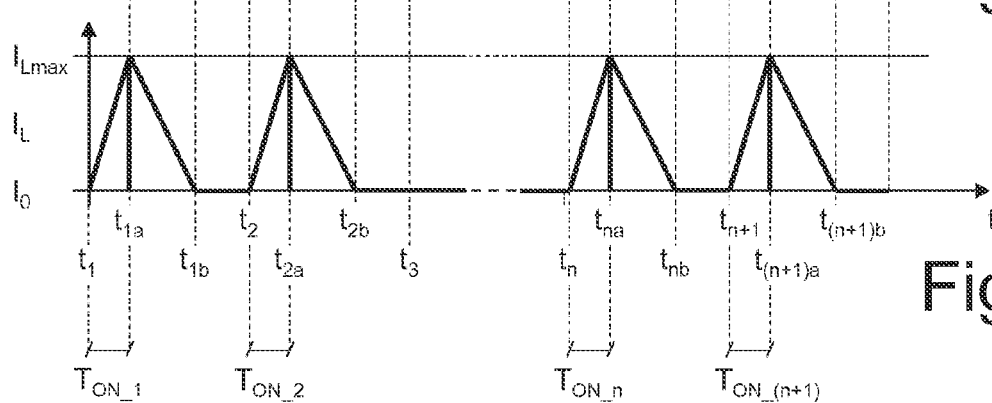

FIGS. 5A and 5B show, using the same time scale as that of FIGS. 4A-4C, a method for controlling the high-side switch 13 and the low-side switch 14 in order to charge and discharge the inductor 18 completely in each time interval $\tau_1$-$\tau_n$ (according to a discontinuous-conduction mode—DCM—or, alternatively, a pseudo-continuous conduction mode—PCCM).

With reference to FIGS. 4A-4C and 5A-5B, considering the instant in time $t_1$ as starting instant, the time interval $\tau_1$ is comprised between $t_1$ and $t_2$. During the time interval $\tau_1$, the coupling switch 22a is closed (FIG. 4A), and the remaining coupling switches 22b-22n are open (FIGS. 4B, 4C). Direct connection to one another of two or more electrical loads 20a-20n is thus prevented, consequently preventing phenomena of cross conduction between the electrical loads 20a-20n.

As regards control of the main bridge 12 (FIG. 5A), during the time interval $\tau_1$, in particular between $t_1$ and $t_{1a}$, the high-side switch 13 is closed while the low-side switch 14 is open; between $t_{1a}$ and $t_{1b}$ the high-side switch 13 is open and the low-side switch 14 is closed. Direct connection of the supply terminal 12a to the reference voltage GND is thus prevented, consequently preventing phenomena of cross conduction between the terminal 12a and the reference terminal GND. As illustrated in FIG. 5B, during the interval $t_1$-$t_{1a}$ the charging current $I_L$ of the inductor 18 increases from the initial value I° (inductor discharged) up to the peak value $I_{Lmax}$, charging the inductor 18. During the interval $t_{1a}$-$t_{1b}$, the inductor 18 is completely discharged, until it reaches again the initial value $I_0$.

According to what is shown in FIGS. 4A-4C, the method described is performed for all n switches (i.e., up to the coupling switch 22n). However, the method for supply of the electrical loads 20a-20n does not necessarily follow a pre-set order. In other words, it is not necessary for the time intervals $\tau_1$-$\tau_n$ to be used for supplying the electrical loads 20a-20n in a pre-set sequence. Instead, each electrical load 20a-20n is supplied only in the case where it requires electrical supply for its operation. If an electrical load is off, or does not require further supply, the time interval $\tau_1$-$\tau_n$ envisaged for supply of such a load is not used for supply of the load itself but for supply of another electrical load 20a-20n, which, instead, needs to be supplied. It is moreover envisaged that two or more temporally immediately consecutive time intervals $\tau_1$-$\tau_n$ are reserved for supplying one and the same electrical load 20a-20n a number of times.

This situation can be described as exemplified hereinafter, once again with reference to FIGS. 4A-4C and 5A-5B. In this case, after supplying the electrical load 20a during the time interval $\tau_1$, the same electrical load 20a is then supplied during the time interval $\tau_2$ (comprised between $t_2$ and $t_3$). Hence, during the time interval $\tau_2$, a new step is carried out for charging the inductor 18 (in the interval $t_2$-$t_{2a}$) and for supplying the electrical load 20a (in the interval $t_{2a}$-$t_{2b}$) by closing the coupling switch 22a (during the entire interval $\tau_2$). The remaining coupling switches 22b-22n are open, preventing cross conduction between the electrical loads 20a-20n. As regards the main bridge 12, during the time interval $\tau_2$ the high-side switch 13 and the low-side switch 14 are controlled as what has been described with reference to the time interval $\tau_1$. Hence, between $t_2$ and $t_{2a}$, the high-side switch 13 is closed and the low-side switch 14 is open. Instead, between $t_{2a}$ and $t_{2b}$, the high-side switch 13 is open and the low-side switch 14 is closed. Likewise, during the interval $t_2$-$t_{2a}$ the current $I_L$ for charging the inductor 18 increases from the initial value $I_0$ (assumed at the end of the time interval $\tau_1$) up to the peak value $I_{Lmax}$. During the interval $t_2$-$2b$, the inductor 18 is completely discharged, until the initial value I° is again reached.

In conclusion, between $t_1$ and $t_{(n+1)}$, all or just some of the electrical loads 20a-20n are supplied in one or more time intervals or time slots, always preventing phenomena of cross conduction between the electrical loads 20a-20n themselves.

As has been said and as is illustrated in FIG. 5B, in each time interval $\tau_1$-$\tau_n$ (and subsequent time intervals $\tau_{(n+1)}$, etc.) the inductor 18 is charged and discharged completely. In detail, the inductor 18 is charged by closing the high-side switch 13, thus coupling the terminal 18a of the inductor 18 to the terminal 12a of the main bridge 12. Discharge of the inductor 18 is obtained by opening the high-side switch 13 and by closing the low-side switch 14. The terminal 18a of the inductor 18 is in this way coupled to the reference terminal GND. The steps of charging and complete discharging of the inductor 18 guarantee the absence of a cross regulation between the various electrical loads 20a-20n.

It is evident that the cross regulation can in any case be minimized even if the inductor 18 does not discharge completely, but the current $I_L$ reaches a value close to the starting value $I_0$. A discharge step that is other than accurate enough can, however, cause in time phenomena of divergence of the current stored in the inductor 18, which increases in an undesirable way. It is hence expedient, in any case, to envisage cycles of complete discharge of the inductor 18.

The step of discharge of the inductor 18 must be appropriately monitored in order to prevent the voltage $V_L$ on the inductor 18 from assuming a negative value, causing an absorption of current by the electrical loads 20a-20n when these are coupled to the inductor 18.

Figure 11:
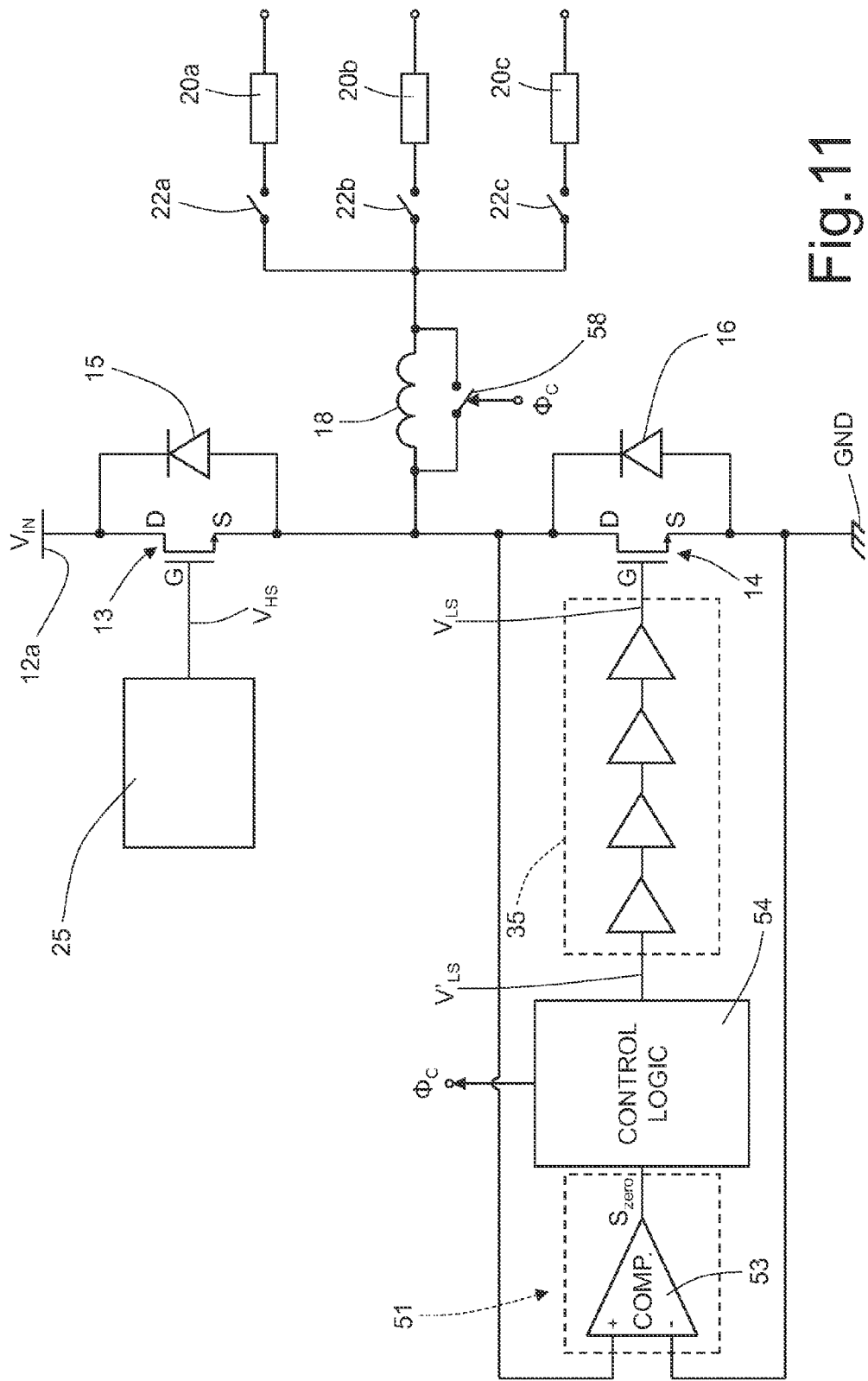
FIG. 11 shows an embodiment of the DC-DC converter comprising circuits for driving switches of the DC-DC converter used during steps of discharge of the inductor.

FIG. 11, described hereinafter, shows an embodiment of a circuit configured to monitor the current that flows from the inductor 18 to the reference terminal GND in order to prevent phenomena of discharge of the load 20a-20n.

Figure 6:
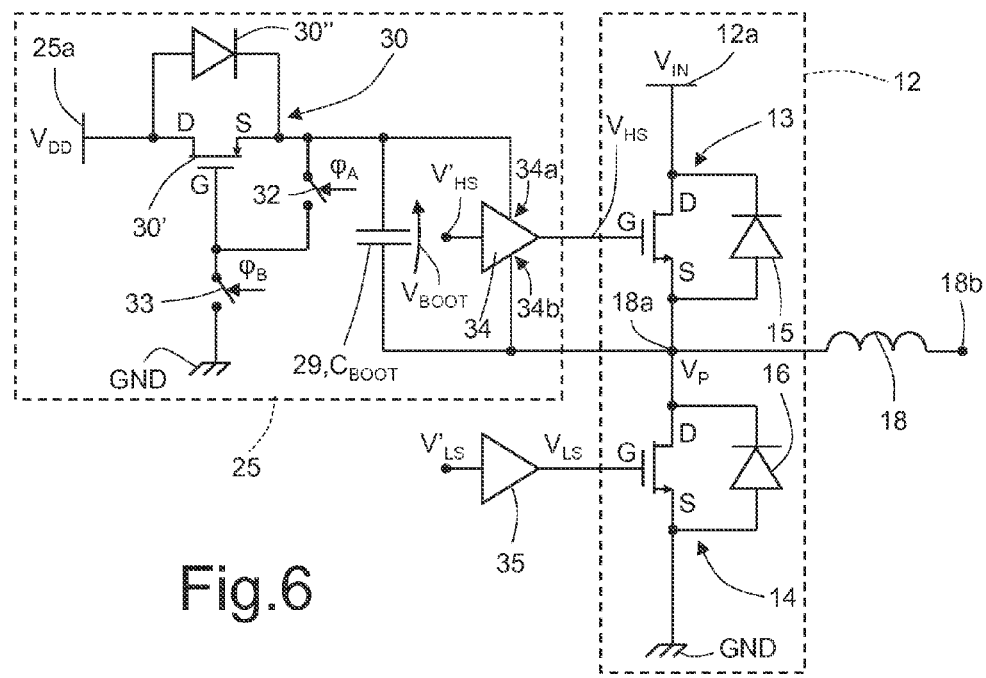
FIG. 6 shows an embodiment of a driving circuit of a switch configured to couple the inductor of the DC-DC converter of FIG. 2 or FIG. 3 with an input supply signal source.

FIG. 6 shows the first and second driving circuits 25, 26 connected to the main bridge 12, according to one embodiment.

With reference to the high-side switch 13, the first driving circuit 25 coupled thereto is configured for driving the high-side switch 13 alternately into an open state, in which the high-side switch 13 does not conduct current, and into a closed state, in which the high-side switch 13 conducts current. With reference to a high-side switch 13 of an n-channel MOSFET type (as illustrated in FIG. 6), the first driving circuit 25 is configured for biasing appropriately the gate terminal G of the high-side switch 13 in such a way that, when it is necessary to close the high-side switch 13, the voltage between the source terminal S and the gate terminal G is higher than the turning-on threshold voltage of the high-side switch 13. For this purpose, the first driving circuit 25 comprises a bootstrap circuit. In detail, the first driving circuit 25 comprises: a supply terminal 25a, at a voltage $V_{DD}$ of between approximately 2 V and approximately 3.3 V, for example approximately 2.5 V; a recharging switch 30 (in particular, illustrated in FIG. 6 is a MOSFET 30', of a p type, with an integrated diode 30" having the drain terminal D connected to the supply terminal 25a); and a capacitor 29, having capacitance $C_{BOOT}$ of between approximately 200 pF and approximately 700 pF, for example approximately 400 pF, connected between the source terminal S of the recharging switch 30 and the terminal 18a of the inductor 18. The recharging switch 30 is configured for coupling the capacitor 29 to the supply terminal 25a for charging the capacitor 29 by means of the voltage $V_{DD}$, and, alternately, uncoupling the capacitor 29 from the supply terminal 25a. The first driving circuit 25 moreover comprises further switches 32 and 33. The switch 32 is connected between the source terminal S and the gate terminal G of the recharging switch 30, while the switch 33 is connected between the gate terminal G of the recharging switch 30 and the reference terminal GND.

The switches 32 and 33 are, for example, MOSFETs controlled in conduction and inhibition by a respective control signal $\phi_A$ and $\phi_B$, applied to the gate terminal of the respective switch 32, 33. The control signals $\phi_A$ and $\phi_B$ are generated by a logic external to the first driving circuit 25 so as to implement the steps described with reference to FIGS. 4A-4C and 5A-5B.

The high-side switch 13 and the low-side switch 14 have the gate terminal G connected to a respective driving device 34, 35. For example, the first and second driving devices 34, 35 are formed, each, by a chain of "m" inverters, where "m" is an even number.

With reference to the driving device 34, the latter comprises a first supply input 34a and a second supply input 34b connected to a floating supply, floating between $V_P$ and $V_{BOOT}$, for generating at output a signal $V_{HS}$ configured to drive (open/close) the high-side transistor 13, on the basis of a signal $V_{HS}'$ that it receives at input, generated by an appropriate control logic (control logic 42 and control logic 85, described more fully hereinafter with reference to FIGS. 8 and 13). Since the driving device 34 is supplied at a voltage of between $V_P$ and $V_{BOOT}$, in use it is able to generate a voltage for driving the gate terminal of the high-side switch 13 higher than the voltage $V_P$ applied to the source terminal S (in particular higher than the turning-on threshold voltage of the high-side switch 13). See, for example, the voltage $V_X$ in FIG. 7c.

With reference to the driving device 35, the latter receives at input a signal $V_{LS}'$ (which is also generated by the control logic), and generates at output a signal $V_{LS}$ configured to drive (open/close) the low-side transistor 14. Since the low-side transistor 14 has its source terminal S connected to the reference GND, a supply circuit similar to the one described with reference to the driving device 34 that will guarantee voltages on the gate terminal G that are variable as a function of the voltage assumed by the source terminal S is not necessary.

Figure 7A:
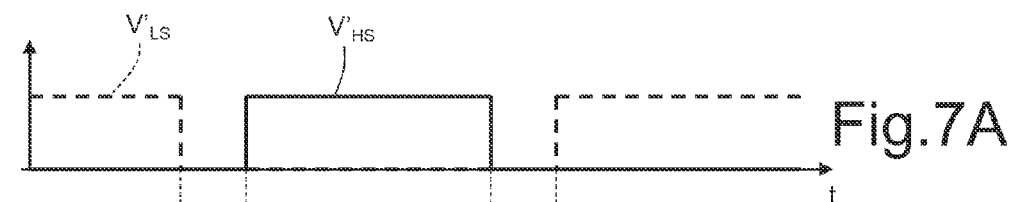
FIGS. 7A and 7B show control signals of the driving circuit of FIG. 6.
Figure 7B:
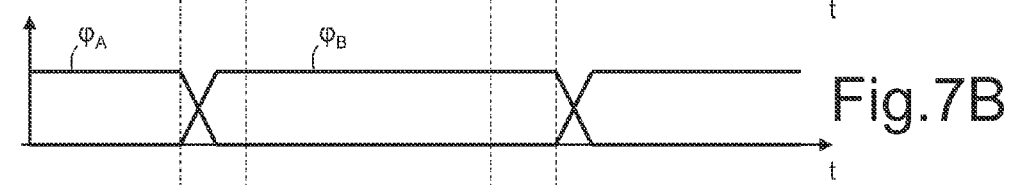
Figure 7C:
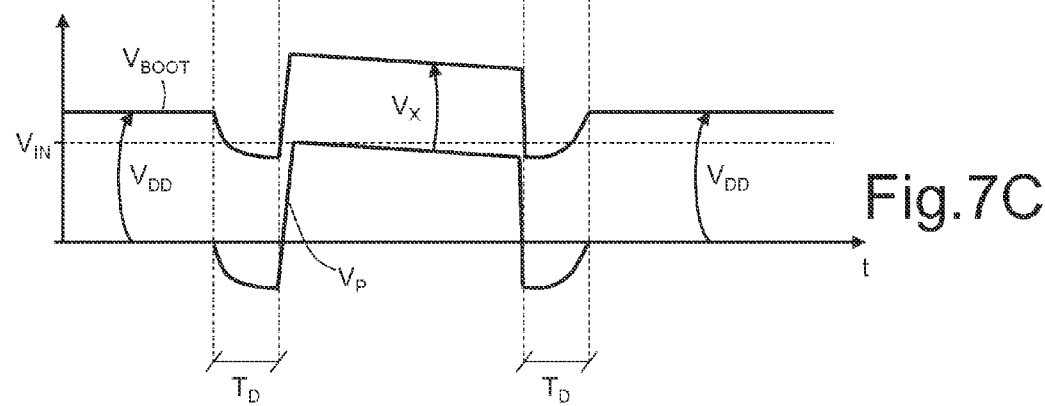
FIG. 7C shows the plot of signals internal to the DC-DC comparator of FIG. 2 or FIG. 3 when it comprises the driving circuit of FIG. 6, using the time scale of the signals of FIGS. 7A and 7B.

FIG. 7A shows, as a function of time t (axis of the abscissae), the plot of the signals $V_{HS}'$ and $V_{LS}'$ applied, respectively, to the driving device 34 and 35; FIG. 7B shows, using the same time scale as that of FIG. 7A, the plot of the control signals $\phi_A$ and $\phi_B$, configured to control in opening and closing the switches 32 and 33 of FIG. 6; and FIG. 7C shows, using the same time scale as that of FIGS. 7A and 7B, the plot of the voltage signal $V_{BOOT}$ and of the voltage signal $V_P$.

When the low-side switch 14 is closed (signal $V_{LS}'$ high), the terminal 18a is connected to the ground reference voltage GND, and the signal $V_P$ is hence at reference voltage GND (e.g., approximately 0 V). During this time interval the capacitor 29 is charged by means of the voltage $V_{DD}$. This is made possible by connecting the capacitor 29 to the supply terminal 25a by closing the switch 30 (the switch 33 is closed, and the switch 32 is open). As has already been said, during the time interval in which the low-side switch 14 is closed, the inductor 18 is connected to ground GND, and a discharge current flows through the low-side switch 14.

When it is necessary to recharge the inductor 18, the switch 30 opens (thus opening the switch 33 and closing the switch 32). Before closing of the high-side switch 13, the low-side switch 14 is opened to prevent phenomena of cross conduction, as has been mentioned previously. The capacitor 29, previously charged, keeps the charge stored and supplies the driving device 34, which, in turn, biases the control terminal of the high-side switch 13, driving it into conduction. The supply terminal 12a is then connected to the terminal 18a of the inductor 18, enabling supply of the electrical load as explained previously.

From FIGS. 7A and 7B, it may be noted that the signal $V_{LS}'$ is at a high value when the control signal $\phi_A$ is at a high value (switch 32 open) and the signal $V_{HS}'$ is at a low value. During this interval, the capacitor 29 is recharged. When the signal $V_{LS}'$ drops, also the control signal $\phi_A$ drops (thus closing the switch 32). At the same time, the control signal $\phi_B$ rises (thus opening the switch 33). After a certain time interval also the signal $V_{HS}'$ rises. Between the falling edge of the signal $V_{LS}'$ and the rising edge of the signal $V_{HS}'$ there is in fact envisaged a guard range $T_D$ ("dead time") to prevent phenomena of cross conduction.

With closing of the high-side switch 13 the voltage $V_P$ rises to the value $V_{IN}$.

In this step, in which the switch 33 is open and the switch is closed, the capacitor 29 is charged ($V_{BOOT} \approx V_{DD}$). With turning-on of the high-side switch 13, the node at voltage $V_P$ increases and, as a result of the (capacitive) bootstrap effect, also the voltage on the opposite plate of the capacitor 29 rises (bootstrap capacitor). The voltage $V_{BOOT}$ across the capacitor 29 is kept substantially constant (but for minor losses, see Eq. 6 given hereinafter). In this way, during the step of turning-on of the high-side switch 13, the driving device 34 is supplied and is hence able to turn on the high-side switch 13.

The voltage drop $V_{BOOT}=V_X$ across the capacitor 29 when the high-side switch 13 is closed is given by $$V_X = V_{DD}\left(1 - \frac{C_{BOOT}}{C_{BOOT} + C_{GS}}\right) \quad (6)$$

where $C_{GS}$ is the capacitance between the gate terminal and the source terminal of the high-side transistor 13.

The embodiment of FIG. 6 enables minimization of the area required for the ensemble formed by the high-side switch 13 and the first driving circuit 25, maintaining good characteristics of performance as regards the resistance in the ON state ($R_{ON}$) and enabling a complete integration of the first driving circuit 25 and of the high-side switch 13 without the need to use external components.

Figure 8:
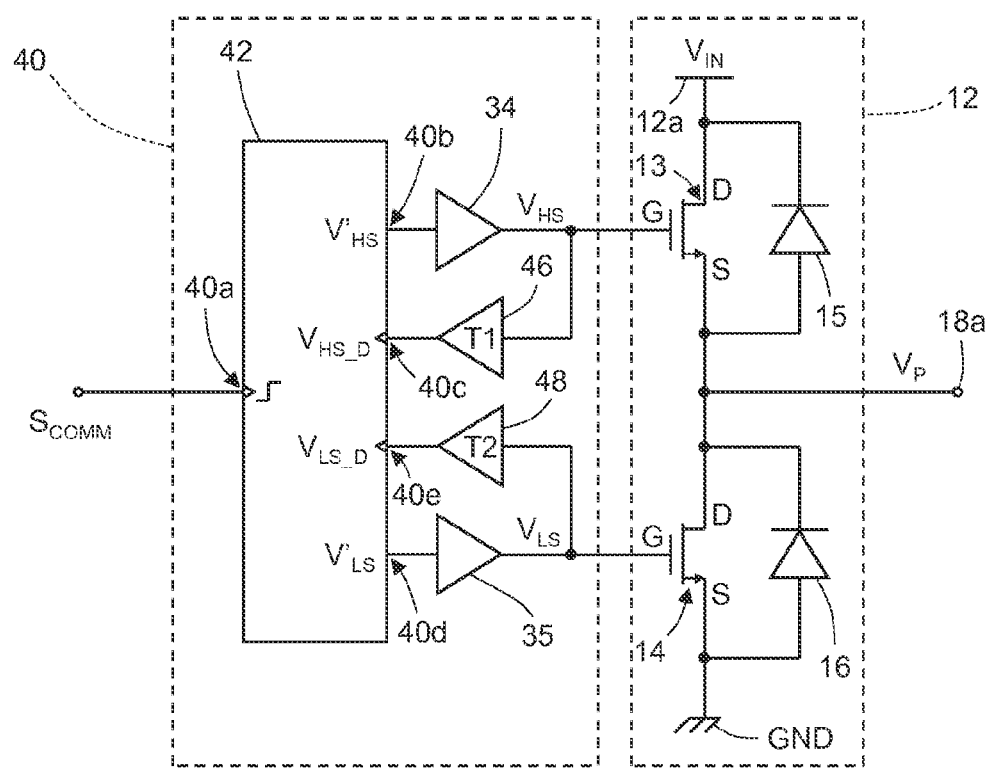
FIG. 8 shows a dead-time generator circuit, which can be coupled to the DC-DC converter of FIG. 2 or FIG. 3.

FIG. 8 is a schematic illustration of a dead-time control circuit 40 according to one embodiment, coupled to the main bridge 12 of the DC-DC converter 10. The dead-time control logic 40 is configured for generating the signals $V_{HS}'$ and $V_{LS}'$, previously described.

The dead-time control circuit 40 comprises a control logic 42, configured for generating the signals $V_{HS}'$ and $V_{LS}'$, on the basis of a command signal $S_{COMM}$, for example a clock signal $S_{COMM}$=CLK_IN that it receives on a first input (input 40a). The signals $V_{HS}'$ and $V_{LS}'$, as has been said, are supplied to the driving devices 34, 35, which generate at output a respective signal $V_{HS}$ and $V_{LS}$ configured to drive the high-side switch 13 and low-side switch 14. The command signal $S_{COMM}$ is a digital signal, configured to assume a low logic value (logic "0") and a high logic value (logic "1").

The dead-time control circuit 40 further comprises a first delay element 46 connected between the output of the driving device 34 and a second input 40c of the control logic 42, and configured for receiving at input the signal $V_{HS}$, delaying it by a time D1, and supplying to the control logic 42 a signal $V_{HS\_D}$ temporally delayed by D1 with respect to the signal $V_{HS}$.

The dead-time control circuit 40 further comprises a second delay element 48 connected between the output of the driving device 35 and a third input 40e of the control logic 42, and configured for receiving at input the signal $V_{LS}$, delaying it by a time D2, and supplying to the control logic 42 a signal $V_{LS\_D}$ temporally delayed by D2 with respect to the signal $V_{LS}$.

The first and second delay elements 46, 48 comprise, for example, a chain of inverters, or of other elements configured to generate the desired delay D1 and D2. For example, the delays D1 and D2 are comprised between 5 ns and 20 ns, for example, approximately 10 ns.

Figure 9:
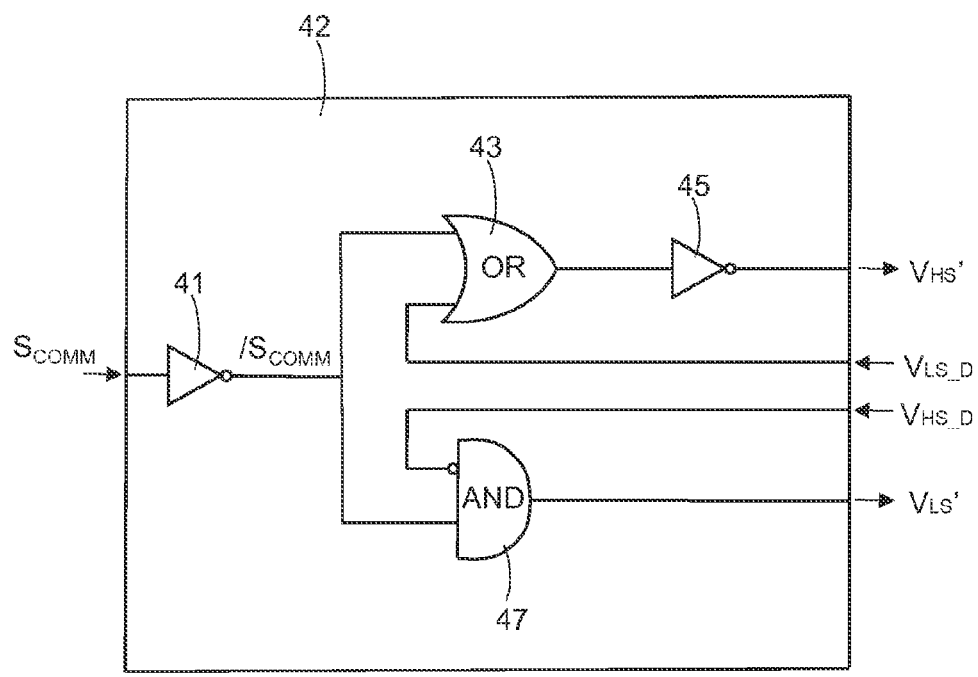
FIG. 9 shows in greater detail a portion of the dead-time generator circuit of FIG. 8.
Figure 10A:
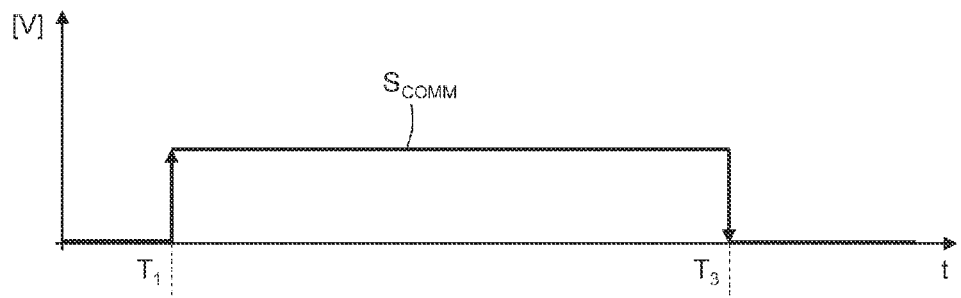
FIGS. 10A-10C show signals for management and control of the dead-time generator circuit of FIGS. 8 and 9.
Figure 10B:
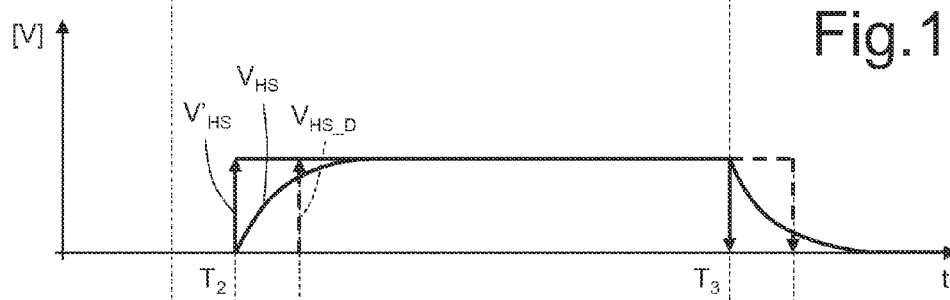
Figure 10C:
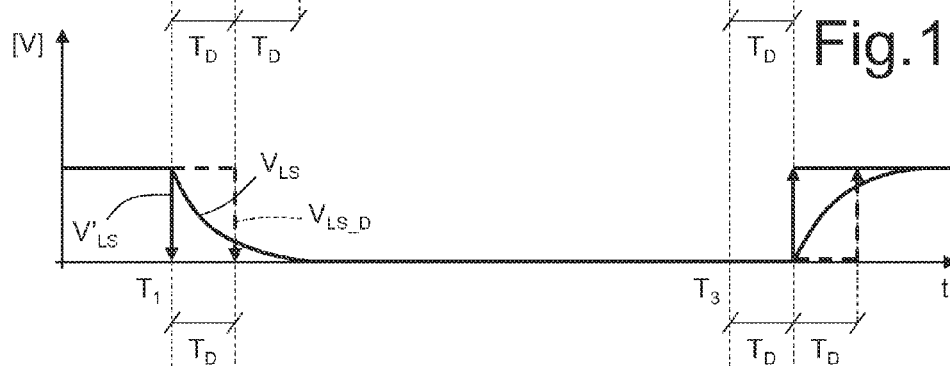
Figure 10D:
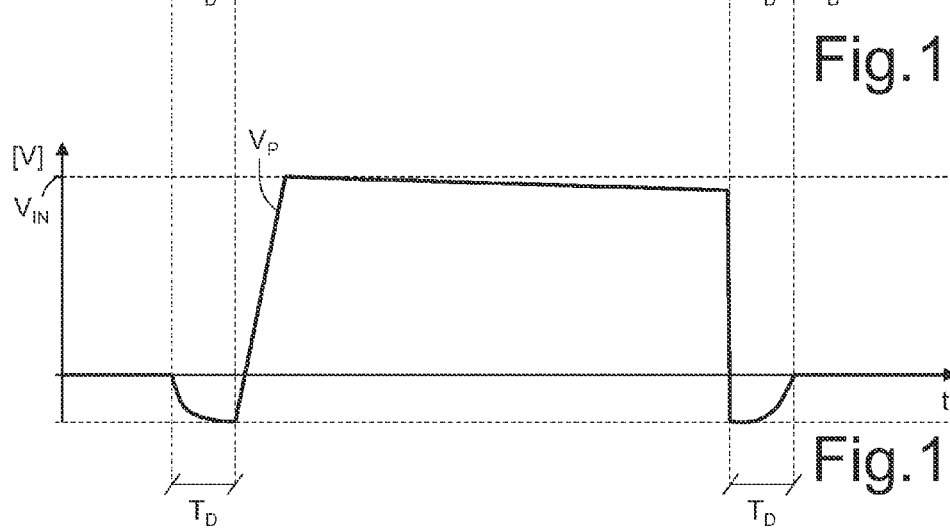
FIG. 10D shows the plot of a signal internal to the DC-DC comparator of FIG. 2 or FIG. 3 when it comprises the dead-time generator circuit of FIG. 8, using the time scale of the signals of FIGS. 10A-10C.

Operation of the control logic 42, for generation of the dead times $T_D$, may be better understood with reference to FIG. 9, which shows in greater detail the control logic 42, and to FIGS. 10A-10D, which are graphic illustrations of the plots of the command signal $S_{COMM}$ (FIG. 10A), of the signals $V_{HS}'$, $V_{HS}$, and $V_{HS\_D}$ (FIG. 10B), of the signals $V_{LS}'$, $V_{LS}$, and $V_{LS\_D}$ (FIG. 10C), with reference to the voltage signal $V_P$ on the terminal 18a of the inductor 18 (FIG. 10D).

The control logic 42 comprises: an inverter 41, which is connected to the input 40a for receiving the command signal $S_{COMM}$ and generates at output a negated command signal $/S_{COMM}$; an OR logic gate 43, configured for receiving at input the negated command signal $/S_{COMM}$ and the delayed signal $V_{LS\_D}$; an inverter 45, connected to the output of the OR logic gate 43, and generating the signal $V_{HS}'$; and an AND logic gate 47, configured for receiving at input the negated command signal $/S_{COMM}$ and the delayed signal $V_{HS\_D}$ and generating at output the signal $V_{LS}'$.

With reference to FIGS. 10A and 10C, at a time T1 the command signal $S_{COMM}$ passes from the low value to the high value. The rising edge of the command signal $S_{COMM}$ indicates the start of the operating steps of the DC-DC converter 10, with control of opening of the low-side switch 14 (in the case where the latter is already open, it is kept open). In the sequel of the operations of the DC-DC converter 10, the steps of opening of the low-side switch 14 are not synchronous with subsequent rising edges of the command signal $S_{COMM}$, but are forced by the control logic 54

(FIG. 11) on the basis of a signal $S_{zero}$ generated by a current detector 51 (see also in this case FIG. 11).

To return to FIGS. 10A-10D, at the rising edge of the command signal $S_{COMM}$, the control logic 42 controls the low-side switch 14 in opening, governing a change of state of the signal $V_{LS}'$, which passes from the high value to the low value (or is kept at a low value in the case where the initial state is the low state). Consequently, the driving device 35 generates the signal $V_{LS}$. After the interval $T_D$ (dead time), in particular $T_D$=D2, the control logic 42 receives at input the signal $V_{LS\_D}$. This fact brings about (time T2) the change of state of the signal $V_{HS}'$, which passes from the low value to the high value. Consequently, the driving device 34 generates the signal $V_{HS}$ for controlling the high-side switch 13 in closing. On account of the delay with which the signal $V_{HS}$ is brought at input to the control logic 42, the latter receives the signal $V_{HS\_D}$ after a delay $T_D$=T1. However, this information can be rejected.

At time T3, the command signal $S_{COMM}$ changes state, passing from the high state to the low state. This brings about a corresponding change of state of the signal $V_{HS}'$. Consequently, the driving device 34 controls the high-side switch 13 in opening (the signal $V_{HS}$ drops to the low value). The control logic 42 detects the change of state of the signal $V_{HS}$ (or, likewise, of the signal $V_{HS}'$) after a certain delay, at time T3+$T_D$. At this instant, the signal $V_{LS}'$ is again controlled in such a way as to turn on the low-side switch 14, and the process resumes. As may be noted, at each half-period of the command signal $S_{COMM}$ there is a switching of the high-side switch 13 and low-side switch 14, always guaranteeing the presence of a dead time $T_D$ to prevent cross conduction between the high-voltage terminal (terminal 12a) and the reference terminal GND.

During the half-period of the command signal $S_{COMM}$ in which the high-side switch 13 is closed and the low-side switch 14 is open (i.e., between T2 and T3), the voltage $V_P$ increases, and the inductor 18 is charged. Instead, in the subsequent half-period, when the low-side switch 14 is closed, the inductor 18 is completely discharged. In order to discharge the inductor 18, it is necessary to apply thereto a voltage of a value opposite to the charging voltage. It is possible to do this in a passive way by exploiting the body diode integrated in a MOSFET, or in an active way using the same transistor as switch. In particular, according to one embodiment, the low-side switch 14 is exploited.

In order to discharge the inductor 18 in an active way, the low-side switch 14 is driven appropriately, as described in what follows with reference to FIG. 11.

When the peak limit value of current $I_{Lmax}$ is reached (see, for example, FIG. 5B), after the dead time $T_D$, managed as described with reference to FIGS. 8 and 10A-10D, the low-side switch 14 is closed, thus connecting the terminal 18a to the ground reference terminal GND, hence enabling the inductor 18 to discharge. When the current that flows in the branch of the low-side switch 14 reaches a lower limit value (for example approximately 0 A), the low-side switch 14 is opens, thus interrupting the connection between the terminal 18a and the ground reference terminal GND.

This guarantees that the current in the inductor 18 does not become negative, which could cause a discharge of the electrical loads 20a-20n, with consequent decrease in the global efficiency. The current that flows in the branch of the low-side switch 14 is monitored by means of a current detector 51, for example comprising a comparator 53 having its non-inverting and inverting inputs connected to opposite conduction terminals of the low-side switch 14 (in particular, the non-inverting input connected to the drain terminal D and the inverting input connected to the source terminal S, or, likewise, the non-inverting input connected to the terminal 18a of the inductor 18 and the inverting input connected to the ground reference terminal GND). A control logic 54 receives the signal $S_{zero}$ generated at output by the comparator 53 and, on the basis of the signal $S_{zero}$ thus received, controls the low-side switch 14 in opening or closing, via the driving device 35 (here represented schematically, by way of example, as a chain of inverters).

The DC-DC converter further comprises an anti-oscillation switch 58, connected in parallel to the inductor 18, as illustrated in FIG. 11. The anti-oscillation switch 58 is controlled in opening/closing by the control logic 54, via the signal $\Phi_C$. In particular, when the current detected by the current detector 51 reaches the lower-limit value, the control logic 54 governs the low-side switch 14 in opening and the anti-oscillation switch 58 in closing. In this way, any spurious phase oscillations at the terminal 18a, caused by residual energy stored in the inductor 18 and in the parasitic capacitor associated to the terminals 18a and 18b, are prevented. In fact, any possible undesirable oscillations can cause problems of an electromagnetic nature, and consequent reduction of the global efficiency of the DC-DC converter.

Figure 12:
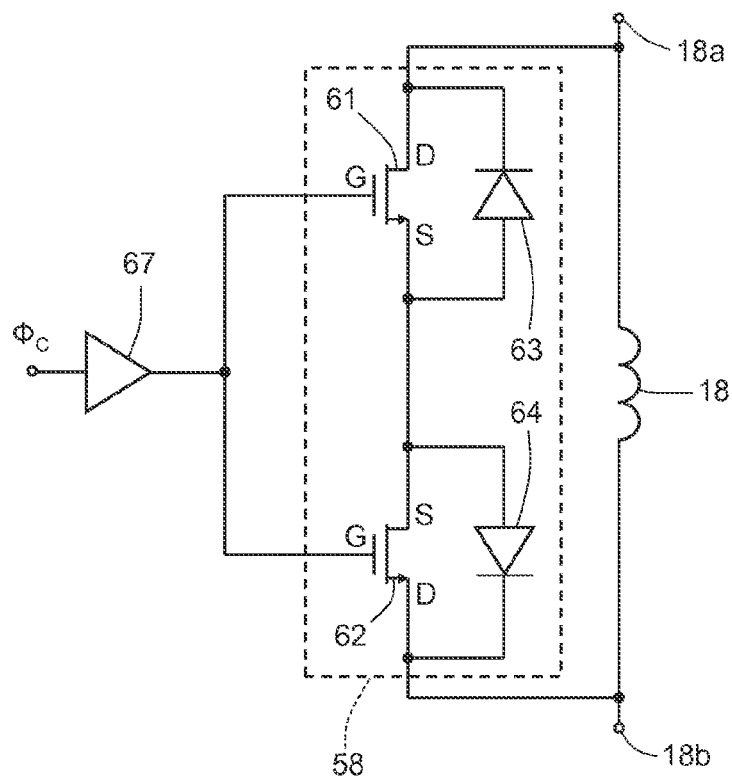
FIG. 12 shows an embodiment of a switch coupled to the inductor of the DC-DC converter of FIG. 11, which can be operated during steps of discharge of the inductor.

FIG. 12 shows in greater detail an embodiment of the anti-oscillation switch 58. The anti-oscillation switch 58 comprises two transistors 61, 62, for example MOSFETs of an n type, connected in "back-to-back" configuration, between the terminal 18a and the terminal 18b of the inductor 18. Illustrated in antiparallel connection with each transistor 61, is a respective diode 63, 64 (diode integrated in the respective transistor 61, 62).

In greater detail, the transistor 61 comprises a drain terminal D connected to the terminal 18a of the inductor 18, the transistor 62 comprises a drain terminal D connected to the terminal 18b of the inductor 18, while the source terminals S of the transistor 61 and of the transistor 62 are connected to one another. The control terminals G of the transistors 61 and 62 are, for example, coupled to a driving device 67, configured to receive at input the signal $\Phi_C$ and control the transistors 61 and 62 in opening/closing, on the basis of the signal $\Phi_C$. The driving device 67 comprises, for example, a plurality of inverters cascaded to one another.

In use, when it is necessary to discharge the residual energy of the inductor 18, the anti-oscillation switch 58 is closed, thus driving in conduction both of the transistors 61 and 62. At the end of the step of discharge of the inductor 18, if one of the electrical loads 20a-20n must be recharged, the anti-oscillation switch 58 is opened, thus driving in inhibition both of the transistors 61 and 62 before closing the high-side switch 13.

As described previously, sharing of a single inductor between a plurality of electrical loads 20a-20n is made possible by the presence of the coupling switches 22a-22n, each of which is coupled to a respective electrical load 20a-20n and is configured for supplying the corresponding electrical load 20a-20n according to a time-multiplexing methodology and in a discontinuous mode DCM (for each electrical load 20a-20n, the inductor 18 is charged and discharged completely to a zero current value). The coupling switches 22a-22n are controlled by means of appropriate signals, in respective non-overlapping time intervals (see FIGS. 4A-4C). Each electrical load 20a-20n is supplied, if necessary, in one or more time slots $\tau_1$-$\tau_n$. A voltage hysteretic comparator verifies whether the respective electrical load 20a-20n needs to be supplied, and, if so, uses a time slot $\tau_1$-$\tau_n$ for its supply, closing the respective coupling switch 22a-22n.

When an electrical load 20a-20n needs to be supplied (e.g., the output voltage of the DC-DC comparator 10, for that particular electrical load 20a-20n, is lower than a given threshold), the main bridge 12 is controlled as described previously in order to charge the inductor 18. Hence, the respective coupling switch 22a-22n is closed, thus connecting the inductor 18 to the respective electrical load 20a-20n. Since control of the coupling switches 22a-22n is carried out in time-multiplexing, these steps are carried out in each time slot $\tau_1$-$\tau_n$. However, the operation of supply of an electrical load 20a-20n is carried out only if the corresponding electrical load 20a-20n needs to be supplied. In the case where no electrical load needs to be supplied, no operation is carried out until one of the outputs needs to be recharged; only if the latter condition is verified are the time slots generated with assignment of each time slot (or, as has been said, of a number of consecutive time slots) to supply of an electrical load. In this way, the energy consumption is minimized, enabling high values of efficiency to be achieved.

Figure 13:
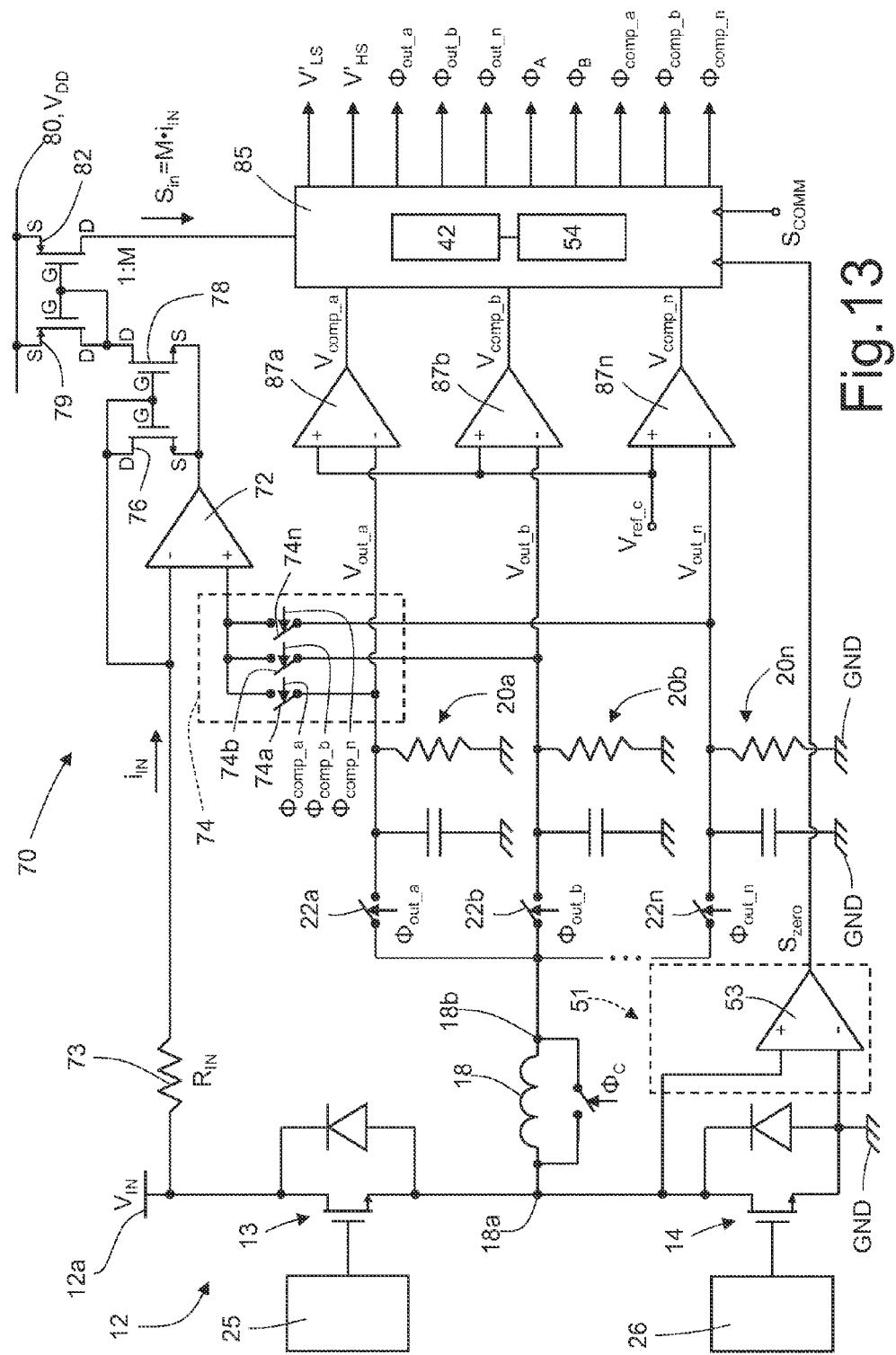
FIG. 13 shows an embodiment of the DC-DC converter comprising an adaptive-control circuit configured for managing coupling and decoupling of the inductor to/from a plurality of electrical loads, for supplying the electrical loads.

FIG. 13 shows the DC-DC converter 10 comprising an adaptive-control circuit 70 configured for managing closing and opening of the high-side switch 13 and low-side switch 14 of the main bridge 12.

The adaptive-control circuit 70 comprises an amplifier 72, having an inverting input coupled, by means of a resistor 73 (with resistance $R_{IN}$ of between approximately 5 MΩ and 20 MΩ; for example $R_{IN}$ is approximately 10 MΩ), to the supply terminal 12a of the main bridge 12, for receiving the supply signal $V_{IN}$, and a non-inverting input that can be coupled, alternatively, to one of the lines for supply of the electrical loads 20a-20n, to pick up the output signal $V_{out\_a}$, $V_{out\_b}$, . . . , $V_{out\_n}$ supplied to the respective electrical load 20a-20n. For this purpose, the adaptive-control circuit 70 comprises a multiplexer device 74, including a plurality of "n" switches 74a-74n, each of which is connected between the non-inverting input of the comparator 72 and a respective line for supply of the loads 20a-20n. The multiplexer device 74 operates in such a way that the non-inverting input of the amplifier 72 is connected, each time, to only one of the output signals $V_{out\_a}$, $V_{out\_b}$, . . . , $V_{out\_n}$, according to the load supplied in each individual time slot (for example, in the time slot $\tau_1$ it receives the signal $V_{out\_a}$, in the time slot $\tau_2$ it receives the signal $V_{out\_b}$, etc.).

The output of the amplifier 72 is connected in feedback mode to the inverting input via a transistor 76, for example a MOSFET of an n type. The source terminal S of the transistor 76 is connected to the output of the comparator 72, whereas the drain terminal D and gate terminal G are both connected to the non-inverting input of the amplifier 72. In this way, the transistor 76 is traversed in conduction by a current proportional to the supply signal $V_{IN}$. Moreover connected to the output of the amplifier 72 is a transistor 78, for example a MOSFET of an n type. The transistor 78 comprises a source terminal S connected to the output of the amplifier 72, a gate terminal G connected to the gate terminal G of the transistor 76 (and hence to the inverting input of the amplifier 72), and a drain terminal D. In particular, the drain terminal D of the transistor 76 is connected to a supply terminal 80 at voltage $V_{DD}$ via a transistor 79. The transistor 79 comprises a source terminal S connected to the supply terminal 80, and a drain terminal D and a gate terminal G connected to one another. A further transistor 82 is connected in current-mirror configuration to the transistor 79. In particular, the transistor 82 comprises a gate terminal connected to the gate terminal of the transistor 79, a source terminal connected to the supply terminal 80, and a drain terminal, connected to control logic 85. The control logic 85 includes, according to the embodiment illustrated, the control logic 42 described with reference to FIG. 8 and the control logic 54 described with reference to FIG. 11.

The adaptive-control circuit 70 converts the input voltage $V_{IN}$ into a current signal $i_{IN}$ proportional to the voltage $V_L$ on the inductor 18 and enables control of the peak current of the inductor 18, preventing it from increasing excessively. In particular, the circuit 70 has the task of generating a current signal $S_{in}$=M·$i_{IN}$ (where 1:M is the gain ratio of the current mirror formed by the transistors 79 and 82) that is proportional to the voltage $V_L$ present on the inductor 18.

The current signal $S_{in}$ is given by $$S_{in}=(V_{IN}-V_{out\_x})\cdot M/R_{IN} \qquad (7)$$

where $V_{out\_x}$ assumes the values $V_{out\_a}$, or $V_{out\_b}$, . . . , or $V_{out\_n}$, according to the load that is supplied in each time slot.

The current signal $S_{in}$ thus generated is used by the control logic 85 for generating a control signal, of duration $T_{ON}$, configured to keep the high-side switch 13 in the ON state (i.e., in conduction). In this way, the peak current $I_{Lmax}$ that flows through the inductor 18 remains constant irrespective of the input voltage $V_{IN}$.

The time interval $T_{ON}$ during which the inductor 18 is charged assumes a variable value according to the input voltage value $V_{IN}$ or, rather, according to the value assumed by the current signal $i_{IN}$, which is proportional to the value of voltage drop $V_L$ on the inductor 18.

In greater detail, the control logic 85 receives at input, via the transistor 82, the signal $S_{in}$ proportional to the current $i_{IN}$ that flows through the resistor 73 (and in the branch comprising the transistors 78 and 79). The signal $S_{in}$ is received by a time-delay generation circuit 81, illustrated in FIG. 14, integrated in the control logic 85. The time-delay generation circuit 81 comprises a transistor 93, a MOSFET of a p type, having the source terminal connected to the drain terminal of the transistor 82, with a transistor 95 in series, a MOSFET of an n type, having the source terminal connected to the reference terminal GND. The gate terminals of the transistors 93 and 95 form an input port 81' of the time-delay generation circuit 81.

The drain terminals of both of the transistors 93 and 95 are connected to one another and to an inverter 96. Moreover connected between the drain terminal of the transistors 93 and 95 and the reference terminal GND is a capacitor 97, having a capacitance $C_{ON}$ of between 100 fF and 1 pF, for example, 500 fF.

The control logic 85 carries out generation of the switching-on/switching-off signals of the high-side switch 13 and of the low-side switch 14, but also generation of the control signals for the switches of the multiplexer device 74 and for the anti-oscillation switch 58. For this purpose, the control logic 42 receives at input, in addition to the command signal $S_{COMM}$, the zero-current signal $S_{zero}$, and the current signal $S_{in}$, also a plurality n of signals indicating the output voltages $V_{out\_a}$-$V_{out\_n}$ of each electrical load 20a-20n. For this purpose, coupled to each load 20a-20n is a respective hysteretic comparator 87a-87n (where each hysteretic comparator, of a type in itself known, comprises a first threshold $V_{th}^-$ and a second threshold $V_{th}^+$, with $V_{th}^-<V_{th}^+$). Each hysteretic comparator 87a-87n comprises an inverting input configured for receiving one of the output signals $V_{out\_a}$-$V_{out\_n}$, and a non-inverting input configured for receiving a reference signal $V_{ref\_c}$.

The reference signal $V_{ref\_c}$ is a bandgap reference, independent of the supply voltage and the temperature. In FIG. 13, the comparators 87a-87n all receive one and the same reference signal $V_{ref\_c}$.

However, it is possible to generate a different reference signal $V_{ref\_c}$ for each comparator 87a-87n, on the basis of the values of the output voltages $V_{out\_a}$-$V_{out\_n}$. The hysteretic control loop of the entire DC-DC converter causes each output to be regulated to the value $V_{ref\_o}$ set for each output load.

The output of each hysteretic comparator 87a-87n indicates the level of voltage assumed by each output signal $V_{out\_a}$-$V_{out\_n}$. The signal $V_{comp\_a}$, $V_{comp\_b}$, ..., $V_{comp\_n}$ generated at output from each hysteretic comparator 87a-87n is received at input and processed by the control logic 85, to be used during the steps of supply of the electrical loads 20a-20n. The latter, in fact, are supplied (recharged) only when the respective output-voltage signal $V_{out\_a}$, $V_{out\_b}$, ..., $V_{out\_n}$ drops below the threshold defined by the reference signal $V_{ref\_c}$.

Each hysteretic comparator 87a-87n has two possible output logic levels, namely, the ground-reference value (GND, or equivalent) and the value of the supply signal ($V_{DD}$). When the n-th signal $V_{comp\_n}$ at output from the n-th hysteretic comparator 87n is equal to $V_{DD}$, then the respective output voltage $V_{out\_n}$ has dropped below the reference $V_{ref\_c}$ and the respective electrical load 20n must be supplied. When the n-th signal $V_{comp\_n}$ at output from the n-th hysteretic comparator 87n is equal to GND, then the respective output voltage $V_{out\_n}$ is greater than the reference $V_{ref\_c}$, and the respective electrical load 20n does not have to be supplied. The characteristic of the n-th comparator 87n is centered around the reference $V_{ref\_c}$ and is the classic hysteretic characteristic (indicatively, with a threshold $V_{th}^+ > V_{ref\_c}$ and $V_{th}^- < V_{ref\_c}$).

To decide whether each electrical load 20a-20n needs to be supplied, the control logic 85 monitors continuously, via the output of each hysteretic comparator 87a-n, the output signals $V_{out\_a}$-$V_{out\_n}$. If one of the output signals $V_{out\_a}$-$V_{out\_n}$ drops below the threshold $V_{th}^-$ of the respective hysteretic comparator 87a-87n, the main bridge is driven as described previously, and the respective electrical load 20a-20n is supplied and charged. The supply of an electrical load 20a-20n takes place, as has been said, during a single time slot $\tau_1$-$\tau_n$ or during a number of time slots immediately consecutive to one another. The charging step terminates when the output signal $V_{out\_a}$-$V_{out\_n}$ exceeds the threshold $V_{th}^+$ (possibly alternating the recharging time slot with other electrical loads that need to be supplied). With this type of control, the output ripple depends exclusively upon the hysteresis of the comparators 87a-87n, whereas the frequency of the charging step is a function of the capacitance of the output capacitor and of the current of the load. In this context, the load current is the current that flows on the load resistance connected in parallel to the output capacitance, as represented in FIG. 13 for each electrical load 20a-20n. The lower the load resistance, the higher the load current. Consequently, on account of the greater need to recharge the electrical load, the ripple has a higher frequency.

Each comparator 87a-87n is configured for having the hysteresis equal to the maximum value of ripple tolerated by the specific application, for example, approximately 10-50 mV.

Figure 16A:
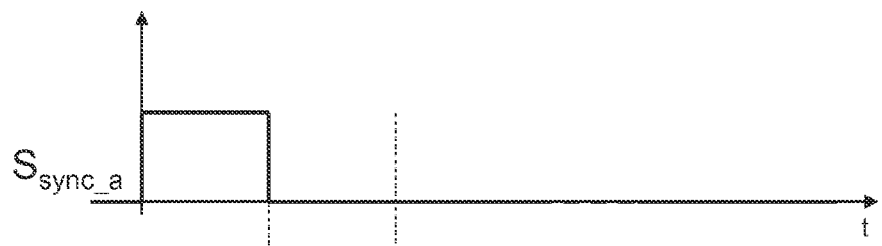
FIGS. 16A-16F show logic signals internal to the circuit of FIG. 15.
Figure 16B:
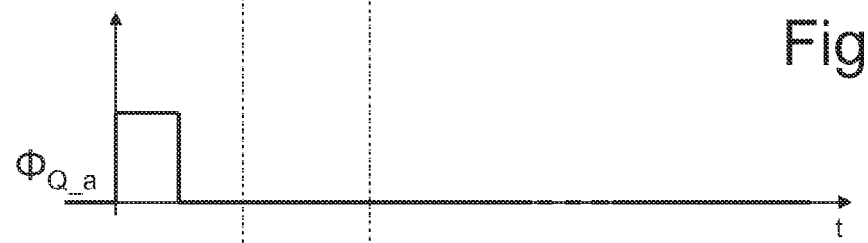
Figure 16C:
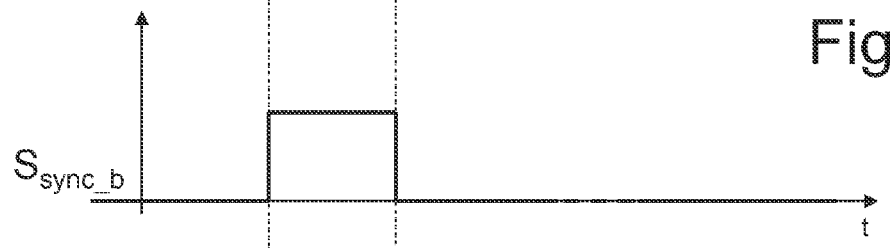
Figure 16D:
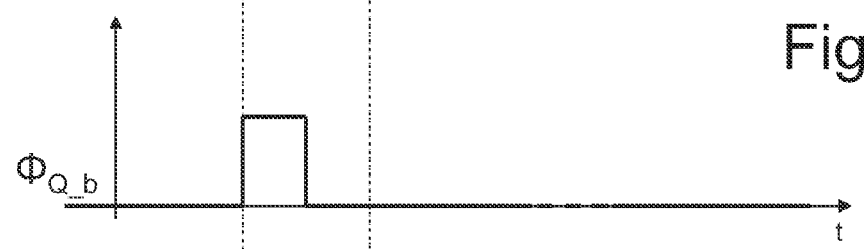
Figure 16E:

As illustrated in FIG. 15, the hysteretic comparators 87a-87n are each connected to a respective flip-flop 89a-89n of a D type, in such a way that the output of each hysteretic comparator 87a-87n is supplied at input to the respective flip-flop 89a-89n. Each flip-flop 89a-89n moreover includes a synchronization input, for receiving a respective synchronization signal $S_{sync\_a}$-$S_{sync\_n}$ (clock signals, schematically illustrated in FIGS. 16a, 16c, 16e).

Figure 14:
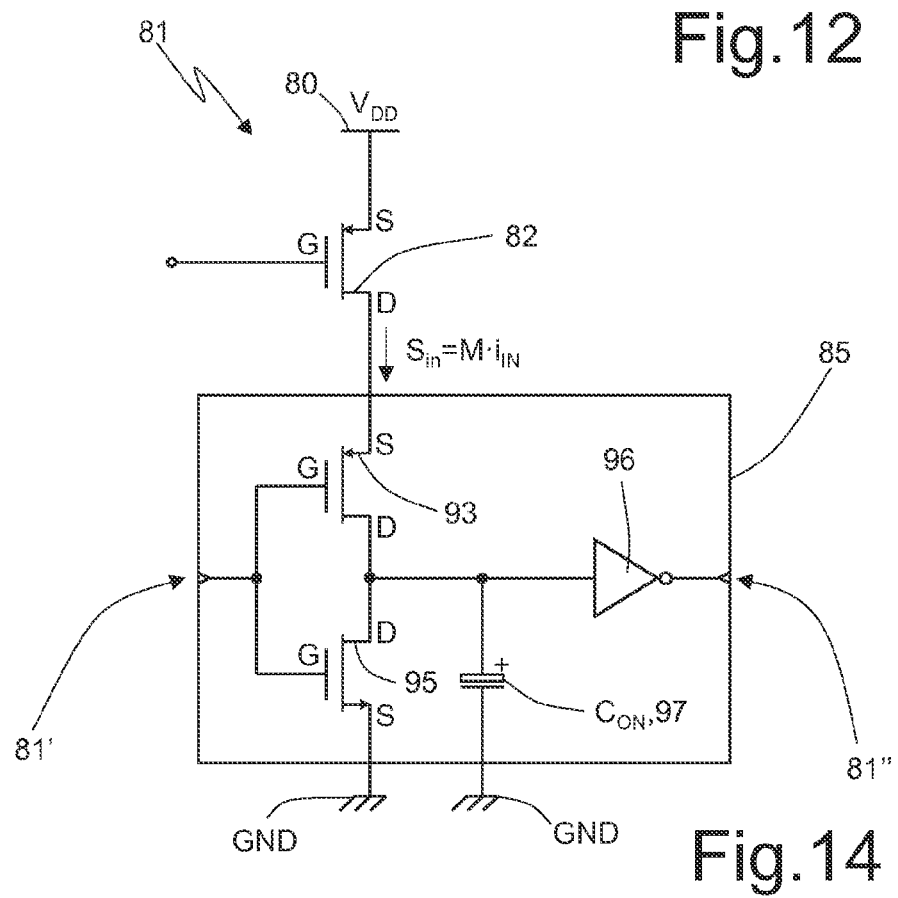
FIG. 14 shows a circuit configured to co-operate with the adaptive-control circuit of FIG. 13 for generation of a time interval for charging the single inductor of the DC-DC converter.
Figure 16F:
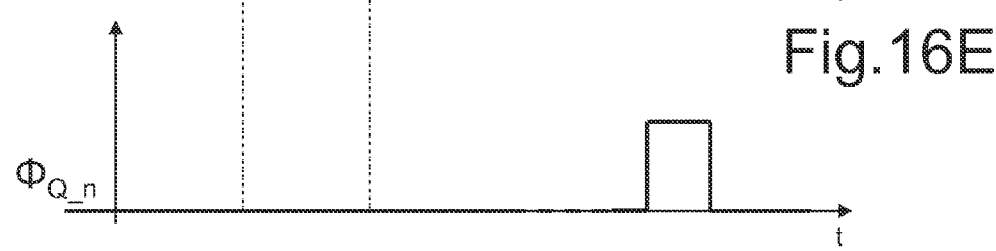

The output /Q of each flip-flop 89a-89n is fed back by means of the time-delay generation circuit 81 of FIG. 14. The output Q of each flip-flop 89a-89n supplies, instead, a respective signal $\Phi_{Q\_a}$-$\Phi_{Q\_n}$ (illustrated in FIGS. 16A, 16D, 16F), each defining a rectangular-window time signal that defines the duration $T_{ON}$. In this way each flip-flop 89a-89n is able to generate a pulse of duration $T_{ON}$ compensated as a function of the value of $V_{IN}$ (is it is to be recalled herein that the time-delay generation circuit 81 receives at input the signal $S_{in}$). The signals $\Phi_{Q\_a}$-$\Phi_{Q\_n}$ are supplied at input to an OR logic, which generates at output the command signal $S_{COMM}$, used, as illustrated previously, for driving the main bridge 12 of the DC-DC converter.

In conclusion, the time-delay generation circuit 81 of FIG. 14 receives at input a digital signal generated by the flip-flop 89a-89n to which it is connected and produces a pulse of duration $T_{ON}$ proportional to the current signal $S_{in}$, exploiting the capacitor 97 and the inverter 96. Since the current $S_{in}$ is proportional to the voltage $V_L$ on the inductor 18 thanks to the adaptive-control circuit 70, the time $T_{ON}$ is inversely proportional to the voltage $V_L$ (as highlighted by Eq. (9)). This enables generation of a peak current $I_{Lmax}$ in the inductor 18 of a constant value as the input voltage $V_{IN}$ varies.

The following Eq. (8) shows the time interval $T_{ON}$ during which the high-side switch 13 is closed and the inductor 18 is charged (with reference to FIG. 5b, the time intervals $t_1$-$t_{1a}$, $t_2$-$t_{2a}$, $t_n$-$t_{na}$, etc.), as a function of the current $i_{IN}$ that charges the capacitor 97:

$$\begin{cases} T_{ON} = C_{ON} \dfrac{V_{th\_inv}}{S_{IN}} = C_{ON} \dfrac{V_{DD}}{2} \dfrac{1}{S_{IN}} \\ S_{IN} = M \dfrac{V_{IN} - V_{out\_x}}{R_{IN}} = M \dfrac{V_L}{R_{IN}} \end{cases} \quad (8)$$

where: $V_{out\_x}$ is the output voltage on the electrical load 20a-20n considered, and chosen in the group comprising the output voltages $V_{out\_a}$, $V_{out\_b}$, ..., $V_{out\_n}$; $V_{th\_inv}$ is the threshold voltage of the inverter 96 of FIG. 14; and $C_{ON}$ is the value of capacitance of the capacitor 97 of FIG. 14.

From Eq. (8) we find that $T_{ON}$ is given by:

$$T_{ON} = C_{ON} \dfrac{V_{DD}}{2} \dfrac{R}{MV_L} \quad (9)$$

i.e., $T_{ON}$ is proportional to $1/V_L$.

As regards the peak current $I_{Lmax}$ that flows in the inductor 18, we have that the current is given, approximately, by the following Eq. (10):

$$I_{L\,max} = \dfrac{V_L}{L} T_{ON} = \dfrac{V_L}{L} C_{ON} \dfrac{V_{DD}}{2} \dfrac{R}{MV_L} \dfrac{R}{MV_L} = \dfrac{RC_{ON}V_{DD}}{2ML} \quad (10)$$

whence we find that the peak current $I_{Lmax}$ does not depend directly upon the value of the input supply voltage $V_{IN}$.

Figure 17:
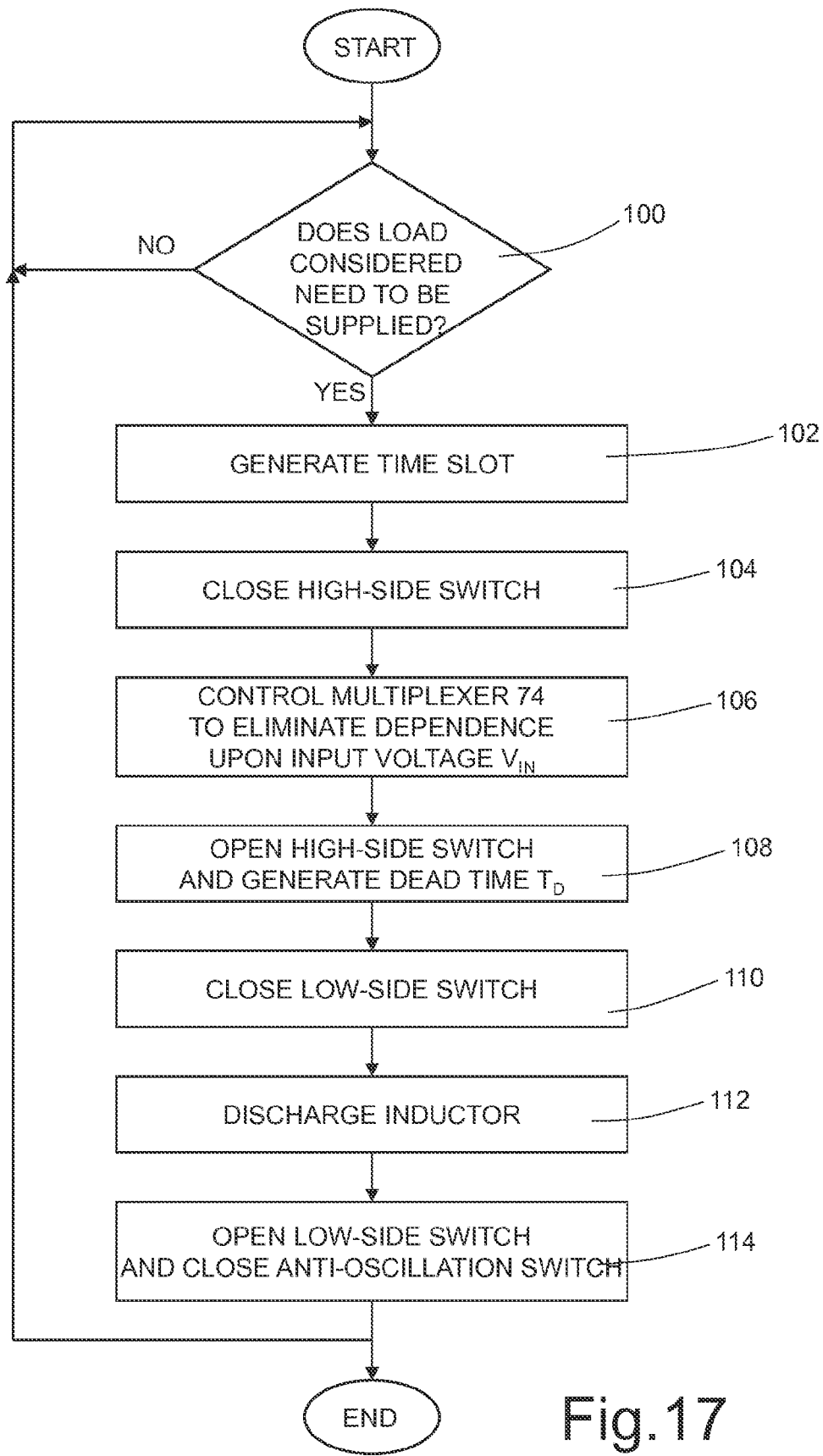
FIG. 17 shows steps of a method for operating the DC-DC converter of FIG. 13 according to one aspect.

FIG. 17 illustrates, schematically and by means of a block diagram, the steps performed by the control logic 85 in each time slot $\tau_1$-$\tau_n$. As has been said, during each time slot $\tau_n$, a single electrical load 20a-20n is supplied, but time slots $\tau_1$-$\tau_n$, immediately consecutive to one another in time can be used for supplying one and the same electrical load 20a-20n.

In the case where no electrical load 20a-20n needs to be supplied, the steps of FIG. 17 are not carried out. In practice, just the step 100 is carried out, in which a check is made to verify whether one of the electrical loads 20a-20n needs to be supplied. In the case where no load needs to be supplied, it is moreover envisaged that the portion of control logic 85 having the task of verifying the value assumed by the signals $V_{comp\_a}$-$V_{comp\_n}$ sends a switching-off signal to the remaining portions of the DC-DC converter so that a further energy saving is guaranteed and hence an increase of efficiency of the converter itself.

With reference to FIG. 17, the control logic 85 verifies (step 100) whether an electrical load (hereinafter the electrical load 20a is considered by way of example) needs to be supplied; the verification is made, as has been said, on the basis of the value assumed by the signal $V_{comp\_a}$ generated by the hysteretic comparator 87a (see also what has been said with reference to FIG. 13). If not (i.e., if the electrical load 20a does not need to be supplied), flow returns to a mode of observation of the outputs (signals $V_{comp\_a}$-$V_{comp\_n}$) until at least one output needs to be charged. Otherwise, if the electrical load 20a is to be supplied, a time slot (for example $\tau_1$) is generated (step 102), and the switch 22a for supply of the load 2a is closed. Control then passes to step 104.

In step 104, the control logic 85 closes the high-side switch 13. For this purpose, at a first rising edge of the command signal $S_{COMM}$, the control logic 85 generates the signals $\phi_A$ and $\phi_B$, for closing the switch 32 and opening the switch 33 (see also FIG. 6). The signals $\phi_A$ and $\phi_B$ generated by the control logic 85 are, for example, supplied at input to a respective driving circuit (not illustrated, for example an amplifier or a cascade of inverters), connected to the switches 32 and 33, and configured for controlling the switches 32, 33 in opening/closing using voltage signals having an appropriate amplitude variable as a function of the specific implementation of the switches 32, 33 (for example, in the case of switches 32, of a MOSFET type, the voltage signals generated by the driving devices as a function of the signals $\phi_A$ and $\phi_B$ are such as to drive the respective MOSFET into conduction by generating a gate-source voltage higher than the threshold voltage of the respective MOSFET).

As described previously, following upon generation of the signals $\Phi_A$ and $\Phi_B$ the signal $V_{HS}'$ that enables closing of the high-side switch 13 is asserted. As soon as the high-side switch conducts, the voltage at the terminal 18a starts to rise, locking to $V_{IN}$. At the same time, owing to the capacitive effect, given that the difference of potential across the capacitor 29 remains unvaried, the voltage $V_{BOOT}$ rises, thus enabling the driving device 34 to generate a signal $V_{HS}$ such as to keep the high-side switch 13 in conduction.

The inductor 18 can hence be charged.

The control logic 85 moreover generates a signal $\Phi_{out\_a}$ for driving the coupling switch 22a. The signal $\Phi_{out\_a}$ (possibly supplied to the coupling switch 22a via an appropriate driving device similar to the one already described) drives the coupling switch 22a in conduction, thus connecting the inductor 18 to the load 20a.

Next (step 106), the control logic 85 generates the signal $\Phi_{comp\_a}$ for closing the switch 74a of the multiplexer device 74. The control logic 85 hence receives at input the signal $S_{in}$ and calculates, according to Eq. (3) given above, the time interval $T_{ON}$ for charging the inductor 18 completely.

At the end of $T_{ON}$ (step 108), the high-side switch 13 opens (the control logic 85 generates an appropriate signal $V_{HS}'$ such that, via the driving device 34, the high-side switch 13 is driven into the open state) and the dead time $T_D$ is generated as described with reference to FIG. 8.

The signal $V_{HS}'$ is a CMOS logic signal, of amplitude equal to $V_{DD}$. The duration at the high value of the command signal $S_{COMM}$ is equal to $T_{ON}$. Hence, the high-side switch 13 opens instantaneously as the command signal $S_{COMM}$ drops to the low level. Instead, the low-side switch 14 closes with a certain delay, which is given by the value of the dead time $T_D$. During the dead time $T_D$ the current of the inductor 18 circulates in the parasitic diode 16 of the low-side switch 14 and the terminal 18a, at voltage $V_P$, drops to values lower than the reference GND (e.g., approximately −0.7 V).

Then, the control logic 85 drives the low-side switch 14 into the closed state by generating the signal $V_{LS}'$, which is applied, via the driving device 35, to the control terminal of the low-side switch 14 (step 110). The signal $V_{LS}'$, like $V_{HS}'$, is a CMOS logic signal of amplitude $V_{DD}$.

The inductor 18 is then discharged (step 112). During the step 112 of discharge of the inductor 18 the discharge current that flows through the low-side switch 14 is monitored by means of the current detector 51, in particular by means of the comparator 53 (see also FIG. 11 and the corresponding description). The control logic 85 receives the signal $S_{zero}$ generated by the comparator 53 and, when it detects that the discharge current of the inductor 18 has reached a zero value (for example by means of comparison with a reference value stored), drives (step 114) the low-side switch 14 into the open state (thus generating the signal $V_{LS}'$) and drives the anti-oscillation switch 58 into the closed state, thus generating the signal $\Phi_C$ (as described previously). Before passing to the possible subsequent time slot the coupling switch 22a is re-opened.

Then, it is possible to supply a subsequent electrical load (for example, an electrical load from among the electrical loads 20b-20n) or else to continue to supply the same electrical load (in this case the electrical load 20a), by generating a new time slot $\tau_2$ (as has been said, only if required by one of the electrical loads).

The method represented in FIG. 17 is carried out only in the case where at least one of the electrical loads 20a-20n requires supply.

The frequency of the command signal $S_{COMM}$ is, according to one embodiment, defined on the basis of a clock signal CLK generated outside the DC-DC converter circuit 10, or generated by a clock circuit of an integrated type. This clock signal CLK is used for generating the signals $S_{sync\_a}$-$S_{sync\_n}$ of the logic of FIG. 15. The clock frequency CLK is, for example, between approximately 100 kHz and approximately 400 kHz, for example approximately 230 kHz. The signal $S_{COMM}$ has, in this case, a frequency equal to CLK. The clock signal CLK can be generated by means of an oscillator circuit of a known type. On each rising edge of the clock signal the time slot is generated, of a duration equal to the period of oscillation of the clock signal. When no output needs to be recharged the clock is set in "sleep" mode, i.e., in low-consumption mode, and no time slot is generated. As soon as an output needs to be charged, the finite-state machine is woken up again and starts again with generation of the time slots in order to supply the electrical loads that need to be supplied.

According to a further embodiment, the command signal $S_{COMM}$ is not defined on the basis of the clock signal CLK. According to this embodiment, the blocks for generation of the command signal $S_{COMM}$ of FIG. 15 (i.e., the flip-flops 89a-89n, the time-delay generation circuits 81, and the OR logic block) no longer use the clock signal CLK, and hence the oscillator circuit may be omitted or de-activated.

In this case, the command signal $S_{COMM}$ is a digital signal of the type shown in FIG. 10A (and consequently the description regarding FIGS. 10B-10D applies in a similar way), which has one or more rising edges and one or more respective falling edges. However, the period of the command signal $S_{COMM}$ is not pre-defined, but can be controlled according to the need. As has been said, the time window comprised between one rising edge of the command signal $S_{COMM}$ and its next rising edge defines the duration of a respective time slot $\tau_1$-$\tau_n$ (FIGS. 4A-4C). Within the time slot $\tau_1$-$\tau_n$ the operations of charging of the inductor 18, supply of the respective load 20a-20n and complete discharge of the inductor 18 are carried out (FIGS. 5A and 5B). FIG. 5B shows a case provided by way of ideal example, in which the steps of discharge of the inductor have all the same duration (see the intervals $t_{1a}$-$t_{1b}$, $t_{2a}$-$t_{2b}$, $t_{na}$-$t_{nb}$, etc.). However, in the majority of real cases, charging and discharging of the inductor 18 can be performed with different timings, depending upon the voltage drop $V_L$ across the inductor itself. The time of charging of the inductor $T_{ON}$ depends, as has been already seen, in a way inversely proportional to the voltage $V_L$, whereas the time of discharge depends upon the output voltage of the load 20a-20n that is being supplied during that particular time slot $\tau_1$-$\tau_n$. It may hence happen that, once again with reference to FIG. 5B, for supply of a certain load 20a-20n the entire interval $t_1$-$t_2$, ..., $t_n$-$t_{n+1}$ is used for charging and discharging the inductor 18, whereas for supply of another, different, load 20a-20n only a minimal part of the interval $t_1$-$t_2$, ..., $t_n$-$t_{n+1}$ is used for charging and discharging the inductor 18.

It is therefore evident that the use of time slots $\tau_1$-$\tau_n$ of pre-defined duration (e.g., based upon the clock signal CLK) is not optimal and may slow down the entire supply system in the case where the time slots $\tau_1$-$\tau_n$ have a duration longer than necessary. It must be considered that a possible fixed duration of the time slots should enable the complete charging and discharging step to be carried out in the slowest case, hence having an excessive duration for all the other possible situations.

Envisaging the use of a command signal $S_{COMM}$ of a non-pre-defined period, it is possible to adapt the duration of each time slot $\tau_1$-$\tau_n$ to the effective duration of charging/discharging of the inductor 18. In other words, when it is necessary to charge the inductor 18 (start of a time slot $\tau_1$-$\tau_n$), the command signal $S_{COMM}$ is forced to a high value. This causes turning-off of the low-side switch 14 and turning-on of the high-side switch 13. After a certain pre-defined time, during which the current in the inductor 18 has reached the peak value $I_{Lmax}$ (the time interval $T_{ON}$ is known, as has been explained previously), the command signal $S_{COMM}$ is forced to a low value. This causes turning-off of the high-side switch 13 and turning-on of the low-side switch 14. The current that flows through the low-side switch 14 is constantly monitored in order to detect when it reaches a value close to the zero value via the comparator 51 (discharging of the inductor 18 is completed). Then, the corresponding time slot $\tau_1$-$\tau_n$ is interrupted by forcing the command signal $S_{COMM}$ again to a high value, if a further supply of one of the electrical loads is necessary. Hence, after discharge of the inductor 18, a new, subsequent, time slot $\tau_1$-$\tau_n$ is immediately generated, once again if necessary. Each time slot $\tau_1$-$\tau_n$ has a duration defined by the sum of the duration of the period of the respective command signal $S_{COMM}$ (step of charging of the inductor) and of the step of discharging of the inductor 18.

The discharge current of the inductor flows in the branch of the low-side switch 14 and is monitored by the current detector 51, which generates the signal $S_{zero}$ when it detects that the current that flows through the low-side switch 14 reaches an approximately zero value. The control logic 54 receives the signal $S_{zero}$ generated at output from the current detector 51 and, on the basis of the signal $S_{zero}$ thus received, controls the transition between one time slot $\tau_1$-$\tau_n$ and a possible next time slot $\tau_1$-$\tau_n$. The overall duration of the time slot can hence vary, and in particular adapts to operation of the DC-DC converter.

Figure 18:
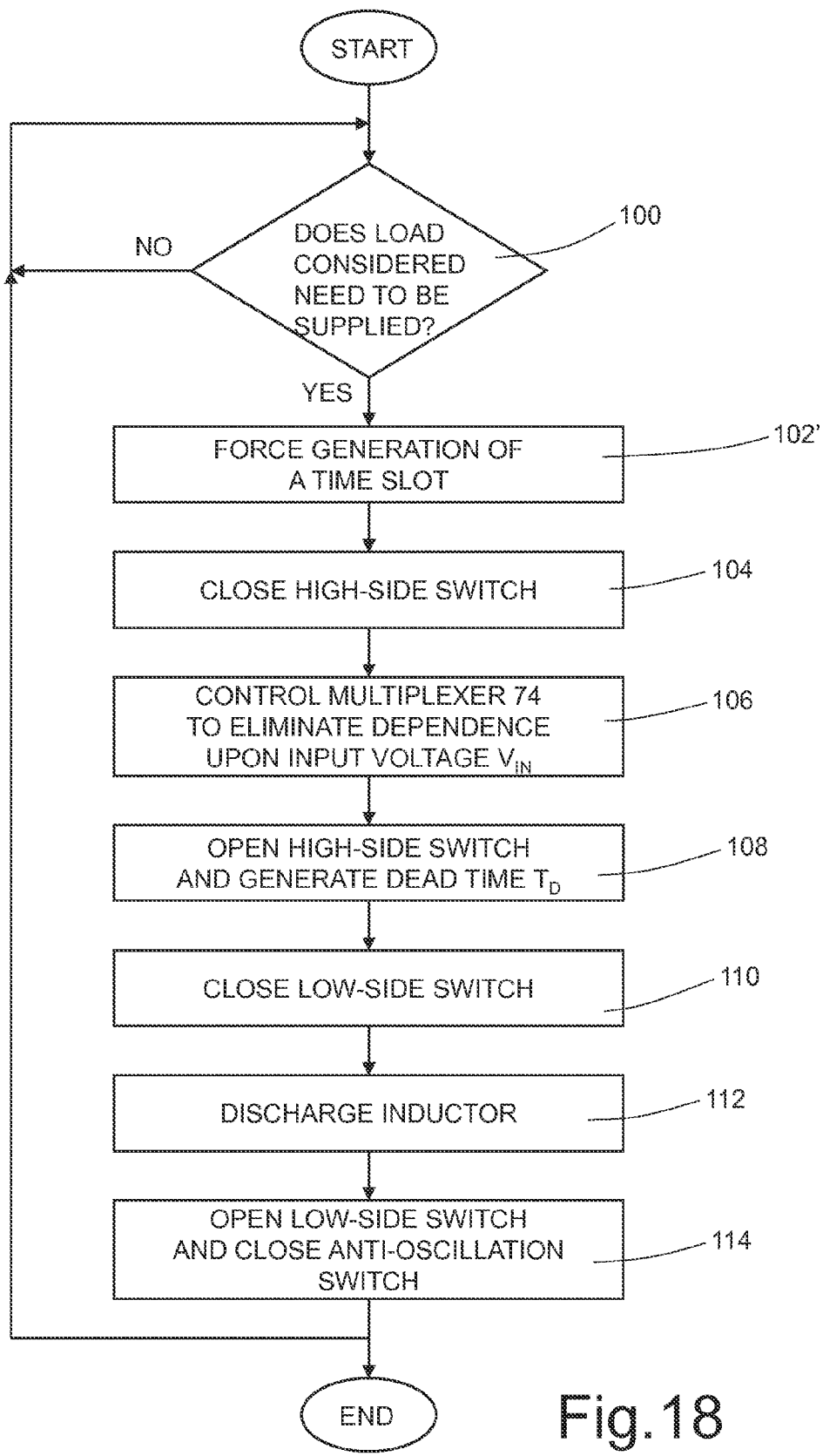
FIG. 18 shows steps of a method for operating the DC-DC converter of FIG. 13 according to a further aspect.
Figure 19A:
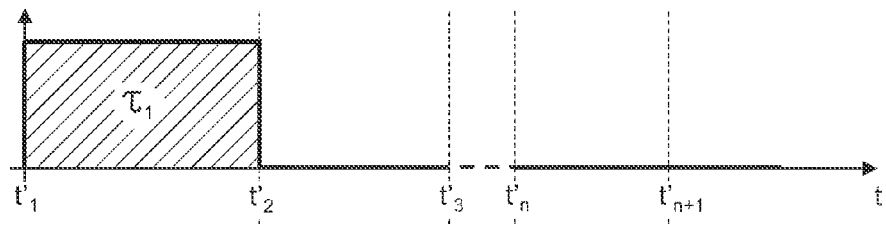
FIGS. 19A-19D show schematically a time division of supply of electrical loads, and steps of charging and complete discharging of the inductor 18 of the DC-DC converter of FIG. 2, or FIG. 3, or FIG. 13, according to a further embodiment.
Figure 19B:
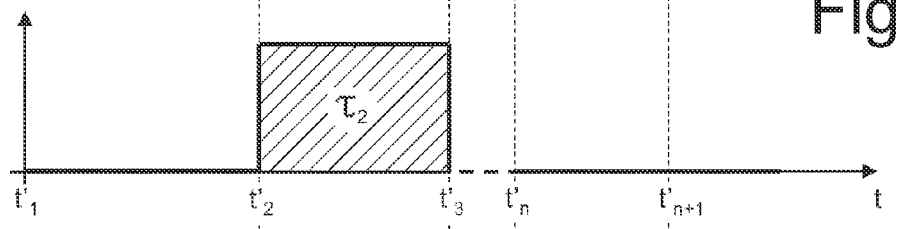
Figure 19C:
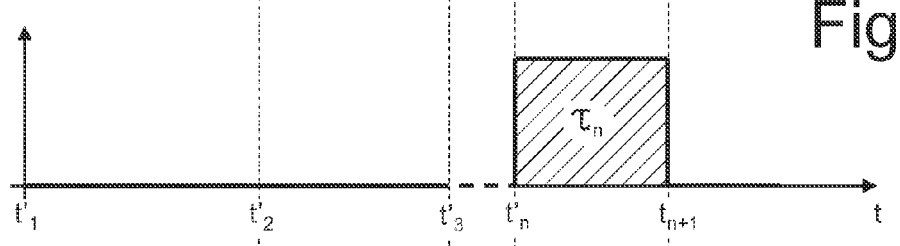
Figure 19D:
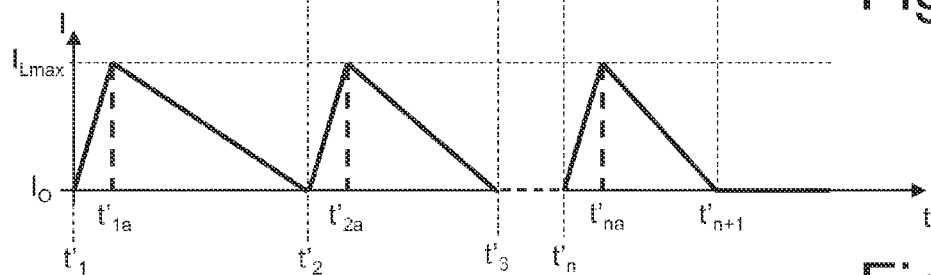

FIG. 18 shows, by means of a flowchart, generation of the command signal $S_{COMM}$ according to what has just been described. FIGS. 19A-19C are graphic illustrations of the temporal succession of time slots $\tau_1$-$\tau_n$ having a variable duration, and FIG. 19d shows the operations of charging/discharging of the inductor 18 in each time slot $\tau_1$-$\tau_n$ according to the steps of the flowchart of FIG. 18.

Steps 100 and 104-114 of the flowchart of FIG. 18 correspond, respectively, to steps 100 and 104-114 of the flowchart of FIG. 17, and are not described any further. Step 102 of FIG. 17 envisages generation of a time slot at pre-defined intervals, i.e., at each rising edge of the clock signal (the duration of the time slot according to FIG. 17 is equal to the period of oscillation of the clock signal and independent of charging/discharging of the inductor, as may be seen from FIGS. 4A-4C and 5A-5B).

Said step 102 is replaced, in FIG. 18, by a step 102', during which generation of the time slot occurs without waiting for the rising edge of a clock signal. Generation of the time slot according to step 102' is carried out immediately as soon as step 100 produces a positive outcome. Consequently, there is no need to wait for a clock signal, and the period of each time slot is not pre-defined either. The period of a time slot according to the steps of FIG. 18 is only defined by the time taken for execution of steps 104-114, which may vary, as has already been said, according to the input voltage (terminal 12a) and the voltage of the load 20a-20n that is being supplied.

With reference to FIGS. 19A-19C, considering the instant $t_1'$ as starting instant, the time interval $\tau_1$ is comprised between $t_1'$ and $t_2'$. During the time interval $\tau_1$, the coupling switch 22a is closed, and the remaining coupling switches 22b-22n are open. There is thus prevented direct connection of two or more electrical loads 20a-20n together, thus preventing phenomena of cross conduction between the electrical loads 20a-20n.

As regards control of the main bridge 12 for charging/discharging the inductor 18 (FIG. 19D), during the time interval $\tau_1$, in particular between $t_1'$ and $t_{1a}'$, the high-side switch 13 is closed, whereas the low-side switch 14 is open. Between $t_{1a}'$ and $t_2'$ the high-side switch 13 is open and the low-side switch 14 is closed. There is hence prevented direct connection of the supply terminal 12a to the reference voltage GND, thus preventing phenomena of cross conduction between the terminal 12a and the reference terminal GND. As shown in FIG. 19D, during the interval $t_1'$-$t_{1a}'$ the charging current $I_L$ of the inductor 18 increases from the initial value $I_0$ (inductor discharged) up to the peak value $I_{Lmax}$, thus charging the inductor 18. During the interval $t_{1a}'$-$t_2'$, the inductor 18 is completely discharged, until the initial value $I_0$ is again reached.

The subsequent time interval, $T_2$ starts immediately at the end of discharge of the inductor 18 during the time interval $t_1'$. Hence, considering the time interval $\tau_2$ (comprised between $t_2'$ and $t_3'$), the coupling switch 22b is closed, and the remaining coupling switches 22a-22n are open, thus preventing cross conduction between the electrical loads 20a-20n.

As regards the main bridge 12, during the time interval $\tau_2$, between $t_2'$ and $t_{2a}'$ the high-side switch 13 is closed and the low-side switch 14 is open; vice versa, between $t_{2a}'$ and $t_3'$, the high-side switch 13 is open and the low-side switch 14 is closed.

Likewise, during the interval $t_2'$-$t_{2a}'$ the charging current $I_L$ the inductor 18 increases from the initial value $I_0$ (assumed at the end of the time interval $\tau_1$) up to the peak value $I_{Lmax}$. During the interval $t_{2a}'$-$t_3'$, the inductor 18 is completely discharged, until the initial value $I_0$ is again reached.

The procedure is then the same for generation of subsequent time intervals $\tau 3$-$\tau_n$, which is carried out only if necessary and by supplying only the electrical loads that need to be supplied (time intervals $\tau_1$-$\tau_n$ that immediately follow one another may be indifferently used for supplying one and the same electrical load 20a-20n or else different electrical loads 20a-20n). It is evident that, once again with reference to FIGS. 19A-19D, with this adaptive creation of the time slots there is ensured for the DC-DC converter the highest speed possible.

In order to obtain high values of efficiency, the current detector 51, and in particular the comparator 53, must be of a low-consumption type; however, for detecting the condition of zero current through the low-side switch 14 as soon as this occurs, the comparator 53 should also guarantee a high speed of response. Since a single comparator 53 is used for detecting the condition of current irrespective of the electrical load 20a-20n that is being supplied (and of the output voltage selected for the load itself), the comparator cannot be configured in a dedicated way for the specific load. This, in fact, would cause an error in the values detected during supply of the other electrical loads.

Figure 20:
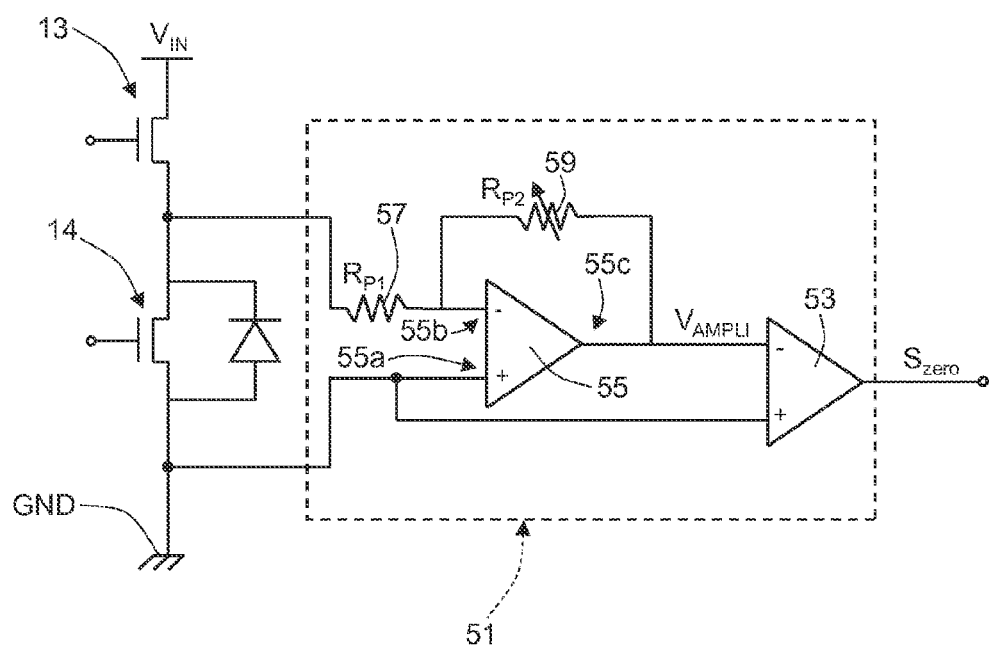
FIG. 20 shows an embodiment of a current-sensing circuit that can be used in the DC-DC converter of FIG. 2, or FIG. 3, or FIG. 13, according to one aspect.

Hence, according to a further aspect, the current detector 51 further comprises a pre-amplifier 55, as shown in FIG. 20. The pre-amplifier 55 is of a variable-gain type, having inputs 55a and 55b of its own (non-inverting input and inverting input) connected to opposite conduction terminals of the low-side switch 14. In detail, the pre-amplifier 55 has its non-inverting input 55a electrically coupled to the source terminal S of the low-side switch 14 (connected to the reference voltage GND) and its inverting input electrically coupled to the drain terminal D of the low-side switch 14 (connected to the terminal 18a of the inductor 18). According to one embodiment, the inverting input is electrically coupled to the terminal 18a via a resistor 57 having resistance $R_{P1}$. In addition, the inverting input is electrically coupled to an output 55c of the pre-amplifier 55 by means of a resistor 59 that can be driven in such a way as to vary its own value of resistance $R_{P2}$. Both of the resistors typically have a resistance of the order of megaohms so as to keep the consumption of the stage at a low level, and enable an amplification of the stage 55 that may range between a factor of 2 and a factor of 10. According to this embodiment, the comparator 53 has its non-inverting input electrically coupled to the source terminal S of the low-side switch 14 (connected to the reference voltage GND), and its inverting input electrically coupled to the output 55c of the pre-amplifier 55. In this way, the comparator 53 receives at input a signal $V_{AMPLI}$ generated at output from the pre-amplifier 55, proportional to the value of current that flows through the low-side switch 14, but amplified with respect to what can be evaluated directly between the drain terminal D and the source terminal S of the low-side switch 14.

With reference to FIGS. 21A-21G, signals are shown provided by way of example of operation of the current detector according to FIG. 20. FIGS. 21A-21D correspond to FIGS. 19A-19D. However, what has been described herein applies in a similar way also to the time intervals defined according to FIGS. 4A-4C and 5A-5B.

During use, as shown by way of example in FIGS. 21A-21G, the pre-amplifier 55 receives at input the voltage signal across the low-side switch 14 (voltage at the node 18a and represented in FIG. 21E) during a first time interval $\tau_1$. It is assumed that during this time interval $\tau_1$ the electrical load 20a will be supplied by closing the coupling switch 22a (the other switches 22b-22n are open). As may be noted from FIGS. 21D and 21E, the voltage $V_P$ at the node 18a reaches, in the time interval $\tau_1$, a negative maximum value equal to $V_{Pmax}$ as soon as the low-side switch 14 is on, in so far as the current signal $I_L$ on the inductor 18 is at the maximum value $I_{Lmax}$. The pre-amplifier 55 is configured so as to generate at output the amplified signal $V_{AMPLI\_1}$. The value of amplification set is such as to obtain a freely chosen pre-defined slope (FIG. 21F).

In a subsequent time interval $\tau_2$ the electrical load 20b is supplied by closing the coupling switch 22b (the other switches 22a and 22c-22n are open). As may be noted from FIGS. 21D and 21E, during $\tau_2$, the voltage $V_P$ at the node 18a reaches a negative maximum value equal to $V_{Pmax}$ as soon as the low-side switch 14 is on, in so far as the current signal $I_L$ on the inductor 18 is at the maximum value $I_{Lmax}$. The pre-amplifier 55 is configured so as to generate at output a new amplified signal $V_{AMPLI\_2}$. The amplification of the stage is such as to generate a signal $V_{AMPLI\_2}$ with a pre-defined slope (FIG. 21F), chosen in such a way as to be approximately equal to the slope of the amplified signal $V_{AMPLI\_1}$. This can be obtained by appropriately modulating the gain of the pre-amplifier 55 according to the voltage generated on each electrical load. In particular, corresponding to a longer time of discharge of the inductor 18 is a proportionally higher gain. Knowing the type of electrical load 20a-20n coupled to the various outputs of the converter and in particular the regulated-voltage value, also the time of discharge of the inductor 18 (i.e., the times $t_{1a}'$-$t_2'$, $t_{2a}'$-$t_3'$, etc.) is known, with a certain approximation. It is thus possible, on the basis of the electrical load 20a-20n that is being supplied during a particular time interval $\tau_1$-$\tau_n$, to establish a priori the gain to be applied to the amplified signal $V_{AMPLI}$ in order to obtain a slope of the amplified signal $V_{AMPLI}$ that does not vary (or varies to a minimal extent) irrespective of the electrical load that is being supplied.

For example, in the case where the pre-amplifier 55 is of the type illustrated, including the variable resistor 59, the control logic 85 is coupled to the variable resistor 59 in such a way as to vary the value of resistance $R_{P2}$ appropriately according to the electrical load that is being supplied. Other types of variable gain amplifiers may be used instead of the pre-amplifier 55 as illustrated in FIG. 20.

FIG. 21G shows the output of the comparator 53. When the value of the amplified signal $V_{AMPLI}$ reaches a value equal to the reference value GND (in this case, the zero value), the comparator 53 generates at output a signal (e.g., an impulsive signal) that identifies this situation. This signal corresponds to the signal $S_{zero}$ described previously.

According to this embodiment, the comparator 53 receives at input a signal having always the same slope (or a slope that varies to a minimal extent), irrespective of the electrical load 20a-20n that is being supplied. It is thus possible to use a comparator 53 configured to work in an optimal way with a precise type of input signals, thus simplifying the circuitry of the comparator 53, reducing the levels of consumption thereof and improving the speed thereof.

According to one aspect, during the step of charging of the inductor 18, the current detector 51 is off so as to obtain energy saving. The current detector 51 is on during the step of discharge of the inductor 18 (i.e., when the current I has reached the peak $I_{LMAX}$). Turning the current detector 51 off and turning it back on is controlled by the control logic 85.

According to a different aspect, the current detector 51 is off when no electrical load 20a-20n needs to be supplied. Turning current detector 51 off and turning it back on is controlled by the control logic 85.

Figure 1:
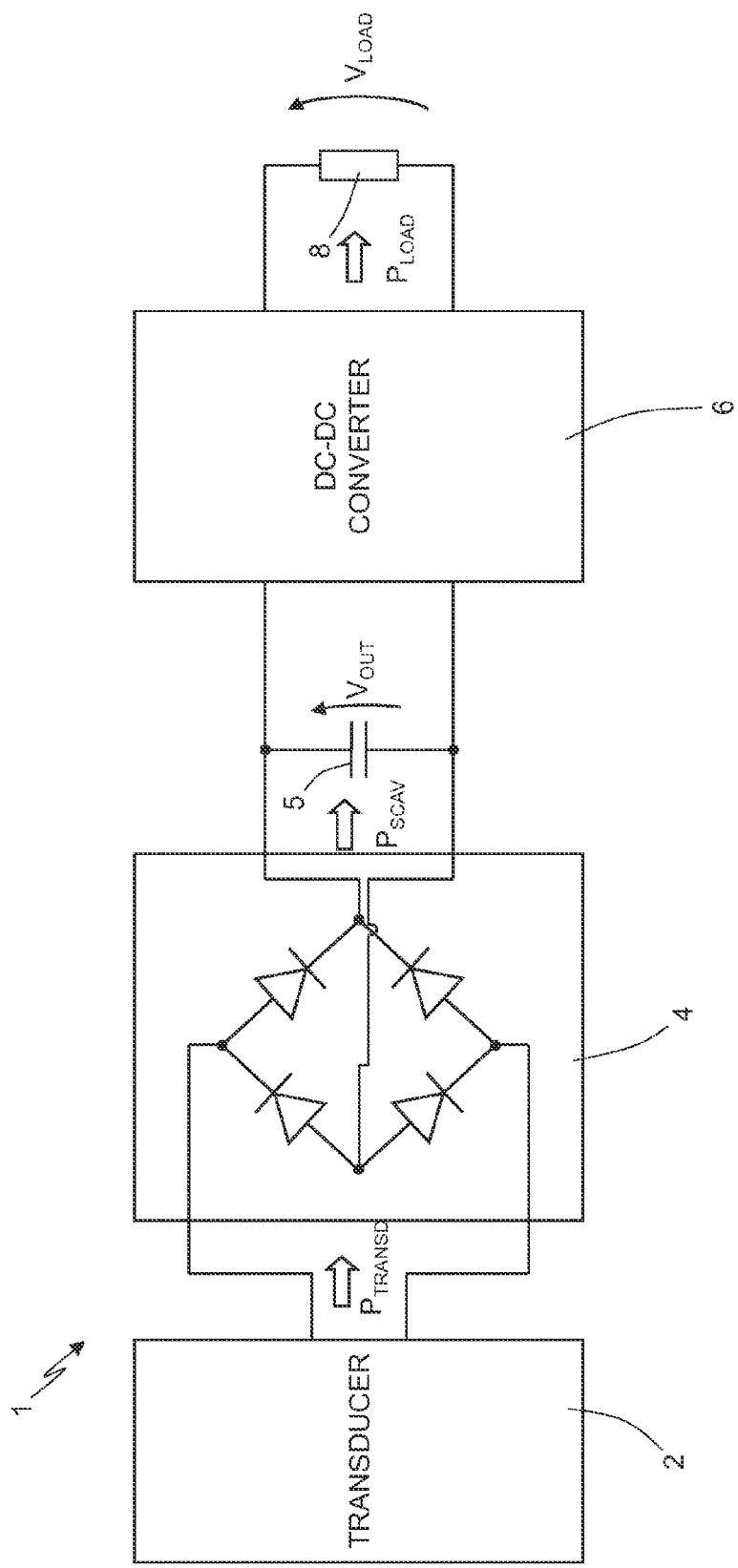
FIG. 1 shows an energy-harvesting system of a known type.
Figure 22:
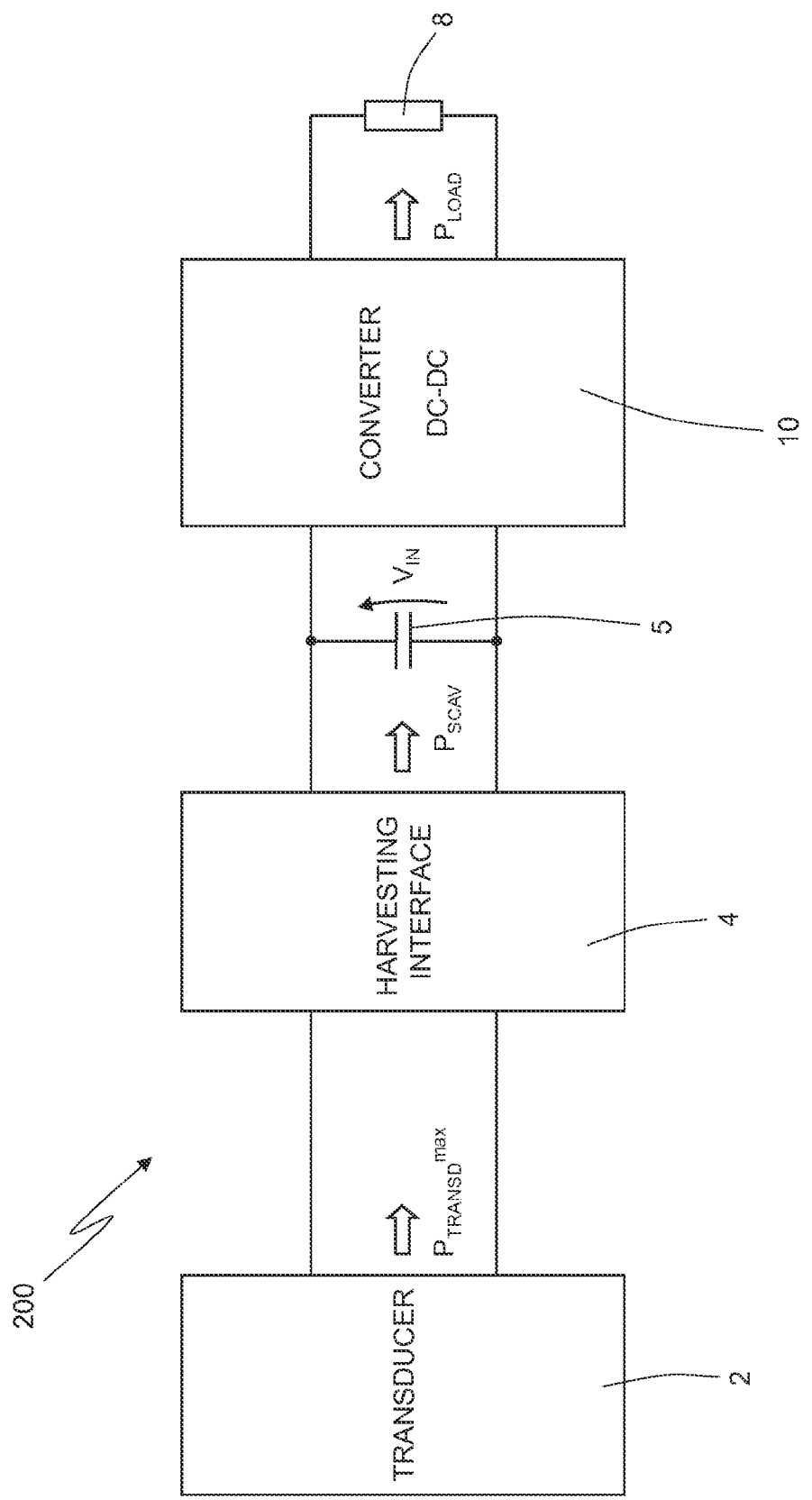
FIG. 22 shows an environmental energy-harvesting system comprising the DC-DC converter of FIG. 13.

FIG. 22 shows an energy-harvesting system 200 comprising the DC-DC converter 10 (for example, according to the embodiment of FIG. 13, possibly including the current detector of FIG. 20, controlled as described with reference to FIG. 17 or FIG. 18 and FIGS. 21A-21G). The energy-harvesting system 200 is similar to the energy-harvesting system 1 of FIG. 1 (elements in common are designated by the same reference numbers), and is not described further herein.

The transducers 2 can be all of the same type or of a type different from one another, indifferently. For example, the transducer/transducers 2 can be chosen in the group comprising: electrochemical transducers (configured to convert chemical energy into an electrical signal), electromechanical transducers (configured to convert mechanical energy into an electrical signal), electroacoustic transducers (configured to convert variations of pressure into an electrical signal), electromagnetic transducers (configured to convert a magnetic field into an electrical signal), photoelectric transducers (configured to convert light energy into an electrical signal), electrostatic transducers, thermoelectrical transducers.

The DC-DC converter 10 is connected to the output of the scavenging interface 4. The energy stored on the storage capacitor of the scavenging interface 4 (known) supplies the DC-DC converter. The input voltage of the DC-DC converter is hence the voltage produced by the scavenging interface 4.

Figure 23:
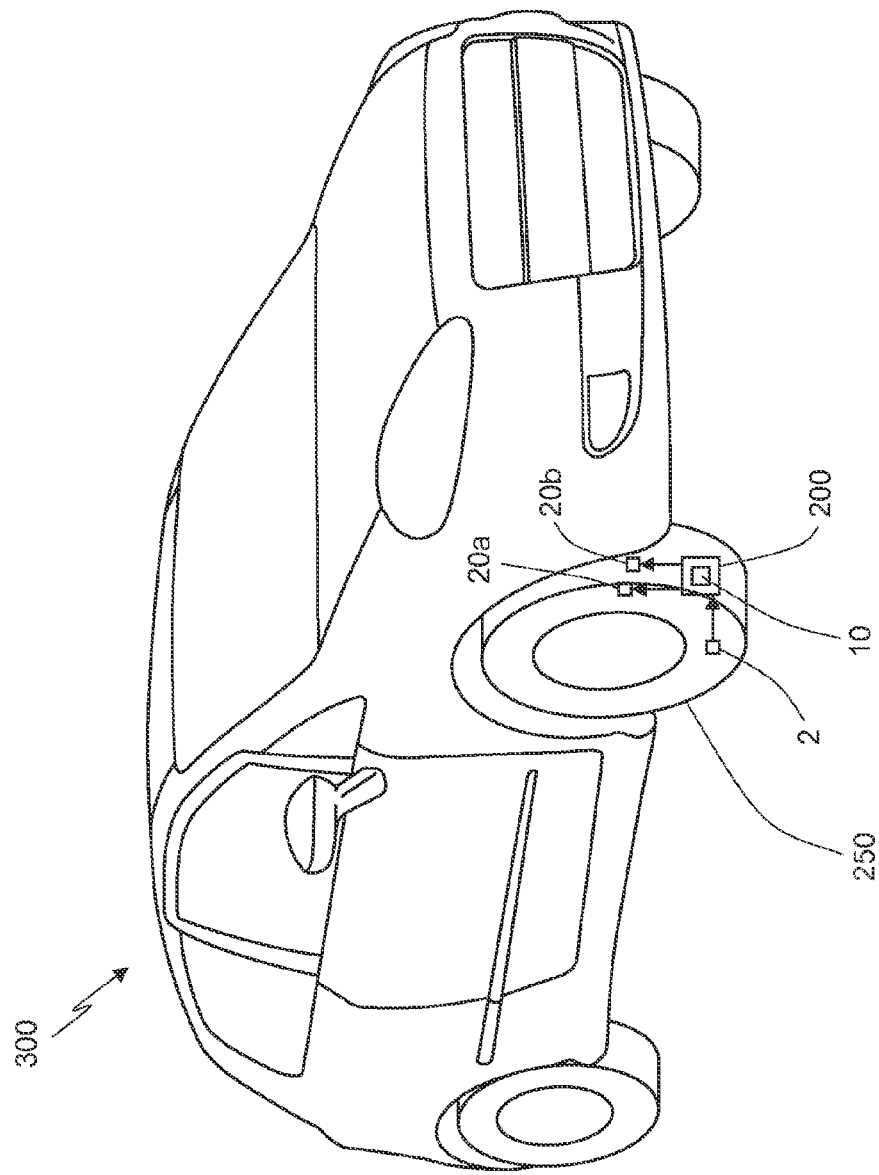
FIG. 23 shows a vehicle comprising the environmental energy-harvesting system of FIG. 18.

FIG. 23 shows a vehicle 300 comprising the energy-harvesting system 200 of FIG. 22, according to one embodiment. The vehicle 300 is, in particular, a motor vehicle. It is evident, however, that the energy-harvesting system 200 can be used in any vehicle 300 or in systems or apparatuses other than a vehicle.

In particular, the energy-harvesting system 200 can find application in generic systems in which it is desirable to harvest, store, and use environmental energy, in particular by means of conversion of mechanical energy into electrical energy.

With reference to FIG. 23, the vehicle 300 comprises one or more transducers 2 coupled in a known way to a portion of the vehicle 300 subjected to mechanical stresses and/or vibrations, for converting the mechanical stresses and/or vibrations into electric current.

The energy-harvesting system 200 is connected to one or more electrical loads 20a, . . . , 20n, via interposition of the DC-DC converter 10, as described. In particular, according to an application, the electrical loads 20a, . . . , 20n comprise, for example, TPM ("tyre parameters monitoring") sensors for monitoring parameters of tyres 250 of the vehicle 300. In this case, the TPM sensors are coupled to an internal portion of the tires 250 of the vehicle 300. Likewise, also the transducers 2 (for example, of an electromagnetic, or piezoelectric type) are coupled to an internal portion of the tires 250. The stress on the transducers 2 when the vehicle 300 is travelling causes production of a current/voltage electrical signal at output from the transducer 2 by means of conversion of the mechanical energy into electrical energy. The electrical energy thus produced is stored, as previously described, in the storage element 5 and supplied, via the DC-DC converter 10, to the TPM sensors.

According to one embodiment, the energy-harvesting system 200 and the TPM sensors are glued inside one or more tires 250. The impact of the tire 250 on the ground during motion of the vehicle 300 enables production of electrical energy.

As an alternative to what is illustrated in FIG. 23, the energy-harvesting system 200 can be set in any other portion of the vehicle 300, and/or used for supplying an electrical load 20a-20n other than or additional to the TPM sensors.

Another possible application of the energy-harvesting system 200 is the generation of electrical energy by exploiting the mechanical energy produced by an individual when he is walking or running. In this case, the energy-harvesting system 200 is located inside the shoes of the individual (for example, inside the sole). In systems aimed at fitness, where it is particularly interesting to count the steps, it is useful to recover energy from the vibrations induced by walking/running to be able to supply, without using a battery, acceleration sensors and/or wireless transmitters (for example, RFID transmitters, BT transmitters, etc.) capable of communicating with cellphones, music-playing devices, or any other apparatus involved in information on the steps performed.

From an examination of the characteristics of the invention obtained according to the present disclosure the advantages that it affords are evident.

In particular, the DC-DC converter 10 enables supply of a plurality of loads 20a-20n that require low supply voltages with high efficiency, using a single inductor 18 and overcoming problems of cross regulation between the loads 20a-20n.

Moreover, the DC-DC converter 10 can be completely integrated in an energy-harvesting system 200, which must typically guarantee high performance and strength in regard to stresses. The high integratability is afforded by the presence of the bootstrap network 25 for turning on the high-side switch 13 of a type internal to (integrated in) the DC-DC converter 10.

In addition, the dead-time generation circuit 40 guarantees generation of an optimal dead time $T_D$ for different input voltages $V_{IN}$.

Furthermore, the adaptive-control circuit 70 enables operation of the DC-DC converter 10 in constant-peak-current mode over a wide range of input voltages, enabling compensation of the time interval $T_{ON}$ for different values of the input voltage $V_{IN}$.

Moreover, the possibility of supplying one and the same electrical load 20a-20n during time slots consecutive to one another (in the case where other electrical loads do not need to be supplied), enables the energy requirements by the electrical loads to be met in an efficient way, without any delay of response. The efficiency is kept high even in the condition of light load (one or more hundred microwatts). The recharging latency is minimized.

In addition, the embodiment of FIG. 18 enables optimization of the time dedicated to supply of each load, optimizing the speed of response of the DC-DC converter to the requirements of supply that arrive from the electrical loads. The control loop does not require a digital clock for operation according to this embodiment. The duration of the time slots adapts to the current profile of the inductor so that the time resources are not wasted. The cross-regulation between outputs is prevented, albeit with a very short latency between consecutive time slots (tens of nanoseconds).

Finally, use of a current detector according to the embodiment of FIG. 20 enables a high accuracy to be obtained in the detection of the zero-current state, thus obtaining a high efficiency of the entire DC-DC converter. Moreover, the current detector enables current consumption to be kept low.

Finally, it is clear that modifications and variations may be made to what has been described and illustrated herein without thereby departing from the sphere of protection of the present invention, as defined in the annexed claims.

In particular, the control technique described is regardless of the circuit architecture of the DC-DC converter.

It can be applied to any DC-DC converter of a SIMO type, of a voltage-boosting type, of a "buck-boost" type, etc.

What is claimed is:

1. A DC-DC converter, comprising:
   a charge switch and a discharge switch connected in series at a common node;
   an inductor having a first conduction terminal coupled to the common node;
   a plurality of coupling switches, each coupling switch coupled between a second conduction terminal of the inductor and a respective electrical load output node to supply an output supply signal;
   a plurality of comparator circuits, each comparator circuit configured to receive a respective output supply signal and a respective comparison reference signal, and each comparator circuit configured to generate a respective comparison result signal indicative of a need to supply the respective electrical load output node;
   a control logic circuit operable in response to a first operating time interval and an immediately subsequent second operating time interval and configured to:
   (a) detect in a first verification instant preceding the first operating time interval whether, on a basis of the respective result signal, a first electrical output node needs to be supplied;
   (b) detect, in a second verification instant immediately subsequent to the first operating time interval but preceding the second operating time interval, whether, on the basis of the respective result signal, any other electrical output nodes need to be supplied; and
   (c) supply said first electrical output node during the first and second operating time intervals in a case where (a) yields a positive outcome and (b) yields a negative outcome.

2. The converter according to claim 1, wherein the control logic circuit is further configured to supply said first electrical output node during the first operating time interval and supply a one of the other electrical output nodes during the second operating time interval in the case where (a) yields the positive outcome and (b) indicates that said other electrical output node needs to be supplied.

3. The converter according to claim 2, wherein the first operating time interval includes a first time portion in which the inductor is charged and a second time portion in which the inductor is discharged, and wherein the second operating time interval includes a first time portion in which the inductor is charged and a second time portion in which the inductor is discharged.

4. The converter according to claim 3, further comprising:
   an adaptive-control circuit configured to acquire for each electrical output node, a signal indicating a voltage value stored across the inductor, and generate the respective first time portion of the first and second operating time intervals having a duration that is a function of the signal indicating the voltage value detected,
   wherein, during the respective first time portion of the first and second operating time intervals, the charge switch is controlled so as to connect the first conduction terminal of the inductor to a source of electrical energy in order to charge the inductor, and wherein, during the respective second time portions of the first and second operating time intervals, the discharge switch is controlled so as to connect the first conduction terminal of the inductor to a reference terminal for discharging the inductor.

5. The converter according to claim 4, wherein the adaptive-control circuit comprises an operational circuit including: a first input terminal coupled to the source of electrical energy to receive an input supply signal; a second input terminal coupled to one of the electrical output nodes to receive the respective output supply signal; and an output terminal configured to supply an intermediate signal proportional to a difference between the input supply signal and the output supply signal, the respective first time portions of the first and second operating time intervals being inversely proportional to said intermediate signal.

6. The converter according to claim 1, further comprising:
   a current-detector circuit coupled to the first conduction terminal of the inductor and configured to generate a discharge-current signal indicative of a comparison of an electrical signal present on the first conduction terminal and a reference signal; and
   a discharge-driving circuit responsive to the discharge-current signal to detect, during the second time portion of the first operating time interval, a zero-current state in which a discharge current through the discharge switch and the inductor assumes a value close to a zero value, and, in response to such detection of the zero-current state open the discharge switch,
   the control logic circuit further configured to terminate the first operating time interval upon detection of the zero-current state.

7. The converter according to claim 6, wherein the current-detector circuit includes:
   a pre-amplifier of a variable-gain type coupled to the first conduction terminal of the inductor and coupled to a reference terminal and configured to generate an amplified signal indicating a value of current that flows through the discharge switch and the inductor; and
   a comparator configured to generate the discharge-current signal in response to a comparison of the amplified signal to the reference signal,
   wherein the control logic circuit is configured to vary a gain of the pre-amplifier such that a slope of the amplified signal is independent of a duration of the second time portions of the first and second operating time intervals.

8. The converter according to claim 6, further comprising an anti-oscillation switch connected in parallel with the inductor, the discharge-driving circuit configured to close the anti-oscillation switch when the discharge current through the discharge switch reaches said value close to the zero value.

9. The converter according to claim 1, further comprising a circuit configured to generate dead times including a guard time interval between the first operating time interval and the second operating time interval.

10. The converter according to claim 9, wherein the circuit configured to generate dead times comprises:
a conduction-control logic configured to generate a first charge-control signal to control the charge switch in a first operating state and, alternatively, in a second operating state, and to generate a first discharge-control signal to control the discharge switch in the first operating state when the charge switch is in the second operating state, and vice versa;
a first delay element configured to acquire a second charge-control signal as a function of the first charge-control signal and apply a delay having a value equal to the guard time interval to generate a delayed charge-control signal;
a second delay element configured to acquire a second discharge-control signal as a function of the first discharge-control signal and apply the delay having the value equal to the guard time interval to generate a delayed discharge-control signal,
the conduction-control logic further configured to acquire the delayed charge-control signal and the delayed discharge-control signal, detect a variation from the first operating state to the second operating state of one between the charge switch and the discharge switch, and generate a corresponding variation from the second operating state to the first operating state of the other between the charge switch and the discharge switch.

11. The converter according to claim 1, further comprising a first circuit configured to drive the charge switch comprising:
a driving device including a plurality of inverters connected in series to one another;
a bootstrap capacitor coupled to a first supply input and to a second supply input of the driving device to supply the driving device;
a bootstrap switch connected between a supply terminal and the first supply input of the driving device that is operated during the first operating time interval to couple the supply terminal to the bootstrap capacitor to charge the bootstrap capacitor and thus supply the driving device.

12. An energy harvesting system, comprising:
a transducer configured to convert energy coming from an energy source external to said system into an AC electrical signal;
a rectifier circuit configured to receive the AC electrical signal and supply a DC output signal;
a first storage element coupled to the rectifier circuit and configured to store electrical energy from the DC output signal; and
a DC-DC converter coupled between the rectifier circuit and electrical output nodes, said DC-DC converter configured to receive the DC output signal generated by the rectifier circuit and supply the electrical output nodes, the DC-DC converter comprising:
a charge switch and a discharge switch connected in series at a common node;
an inductor having a first conduction terminal coupled to the common node;
a plurality of coupling switches, each coupling switch coupled between a second conduction terminal of the inductor and a respective electrical load output node to supply an output supply signal;
a plurality of comparator circuits, each comparator circuit configured to receive a respective output supply signal and a respective comparison reference signal, and each comparator circuit configured to generate a respective comparison result signal indicative of a need to supply the respective electrical load output node;
a control logic circuit operable in response to a first operating time interval and an immediately subsequent second operating time interval and configured to:
(a) detect in a first verification instant preceding the first operating time interval whether, on a basis of the respective result signal, a first electrical output node needs to be supplied;
(b) detect, in a second verification instant immediately subsequent to the first operating time interval but preceding the second operating time interval, whether, on the basis of the respective result signal, any other electrical output nodes need to be supplied; and
(c) supply said first electrical output node during the first and second operating time intervals in a case where (a) yields a positive outcome and (b) yields a negative outcome.

13. The energy harvesting system of claim 12 as installed within an energy generating apparatus.

14. The energy harvesting system of claim 13, wherein said energy generating apparatus is one of a transport device or an item of footwear.

15. A method for operating a DC-DC converter which supplies a plurality of electrical loads, the method comprising the steps of:
(a) for each electrical load, comparing a respective output supply signal with a respective comparison reference signal;
(b) generating a respective result signal obtained from the comparison of step (a) indicating a need to supply the respective electrical load;
(c) generating a first operating time interval and an immediately subsequent second operating time interval during which the DC-DC converter supplies the respective electrical load of the plurality of electrical loads;
(d) detecting, in a first verification instant preceding the first operating time interval whether, on a basis of the respective result signal, a first electrical load from among the plurality of electrical loads needs to be supplied;
(e) detecting, in a second verification instant immediately subsequent to the first operating time interval but preceding the second operating time interval whether, on the basis of the respective result signals, the remaining electrical loads of the plurality of electrical loads need to be supplied; and
(f) supplying said first electrical load during the first and second operating time intervals in a case where step (d) yields a positive outcome and step (e) yields a negative outcome.

16. The method according to claim 15, further comprising the steps of:
supplying said first electrical load during the first operating time interval; and supplying a second electrical load of the plurality of electrical loads during the second operating time interval in the case where step (d) yields the positive outcome and step (e) indicates that said second electrical load needs to be supplied.

17. The method according to claim 16, further comprising the steps of:
controlling a charge switch to charge an inductor during a first time portion of the first operating time interval;
controlling a discharge switch to discharge the inductor during a second time portion of the first operating time interval;
controlling the charge switch to charge the inductor during a respective first time portion of the second operating time interval; and
controlling the discharge switch to discharge the inductor during a respective second time portion of the second operating time interval.

18. The method according to claim 15, further comprising the steps of:
acquiring, for each electrical load to be supplied, a signal indicating a voltage value stored on an inductor of the DC-DC converter; and
generating the respective first time portion of the first and second operating time intervals having a duration that is a function of the voltage value.

19. The method according to claim 15, further comprising the steps of:
acquiring an operating electrical signal that is a function of an electrical signal at an inductor of the DC-DC converter and is indicative of a value of a discharge current flowing through a discharge switch coupled to the inductor;
comparing the operating electrical signal to a reference signal;
generating, on the basis of said comparison, a discharge-current signal indicating a zero-current state in which the discharge current assumes a value close to a zero value; and
once the zero-current state has been reached, opening the discharge switch and terminating the first operating time interval.

20. The method according to claim 19, further comprising the steps of:
amplifying, using a first gain value, the electrical signal present at the inductor at an initial instant of the second time portion of the first operating time interval to generate a first amplified signal; and
amplifying, using a second gain value, the electrical signal present at the inductor at an initial instant of the second time portion of the second operating time interval to generate a second amplified signal,
wherein the first and second gain values are chosen in such a way that a slope of the first and second amplified signals is independent of a duration in time of the second time portions of the first and second operating time intervals,
wherein the step of acquiring the operating electrical signal comprises acquiring the first amplified signal during the first operating time interval and acquiring the second amplified signal during the second operating time interval.

21. The method according to claim 19, further comprising closing an anti-oscillation switch connected in parallel to the inductor when the discharge current reaches said value close to the zero value.

22. The method according to claim 15, further comprising the step of generating a third time interval between the first operating time interval and the second operating time interval.

23. The method according to claim 22, further comprising the steps of:
generating a first charge-control signal configured to control a charge switch coupled to an inductor in a first operating state and, alternatively, in a second operating state;
generating a first discharge-control signal configured to control a discharge switch coupled to the inductor in the first operating state when the charge switch is in the second operating state, and vice versa;
acquiring a second charge-control signal as a function of the first charge-control signal;
delaying the second charge-control signal by a value equal to the third time interval to generate a delayed charge-control signal;
acquiring a second discharge-control signal as a function of the first discharge-control signal;
delaying the second discharge-control signal by the value equal to the third time interval to generate a delayed discharge-control signal;
detecting, on the basis of the delayed charge-control signal or of the delayed discharge-control signal, a variation from the first operating state to the second operating state of one between the charge switch and the discharge switch; and
generating a variation from the second operating state to the first operating state of the other between the charge switch and the discharge switch.

* * * * *

UNITED STATES PATENT AND TRADEMARK OFFICE
CERTIFICATE OF CORRECTION

| | | |
|---|---|---|
| PATENT NO. | : 9,450,489 B2 | |
| APPLICATION NO. | : 14/181063 | |
| DATED | : September 20, 2016 | |
| INVENTOR(S) | : Alessandro Gasparini et al. | |

It is certified that error appears in the above-identified patent and that said Letters Patent is hereby corrected as shown below:

In the Specification:

At column 4, line number 54, please add the reference number -- 18 -- between the words "inductor" and "coupled".

At column 12, line number 32, please add the reference number -- 62 -- after the reference number "61,".

Signed and Sealed this
Fifteenth Day of November, 2016

Michelle K. Lee
*Director of the United States Patent and Trademark Office*